US007889060B2

(12) United States Patent
Yamanobe et al.

(10) Patent No.: US 7,889,060 B2
(45) Date of Patent: Feb. 15, 2011

(54) ACTIVE RADIO TAG, SECURITY MANAGEMENT SYSTEM, AND SECURITY MANAGEMENT METHOD

(75) Inventors: Jin Yamanobe, Ayabe (JP); Kenji Takemura, Kusatsu (JP); Yoshimasa Sugitate, Kusatsu (JP); Takeshi Miyamoto, Moriyama (JP)

(73) Assignee: Omron Corporation, Kyoto (JP)

( * ) Notice: Subject to any disclaimer, the term of this patent is extended or adjusted under 35 U.S.C. 154(b) by 943 days.

(21) Appl. No.: 11/798,905

(22) Filed: May 17, 2007

(65) Prior Publication Data

US 2007/0273521 A1 Nov. 29, 2007

(30) Foreign Application Priority Data

May 18, 2006 (JP) ............................. 2006-138927

(51) Int. Cl.
*H04Q 5/22* (2006.01)
(52) U.S. Cl. .................. 340/10.5; 340/10.1; 340/572.1; 340/5.1; 340/5.21; 340/5.6; 340/5.7; 340/5.8
(58) Field of Classification Search ............... 340/572.8
See application file for complete search history.

(56) References Cited

U.S. PATENT DOCUMENTS

| 5,122,643 | A | * | 6/1992 | Gamou et al. ............... 235/384 |
| 5,317,309 | A | * | 5/1994 | Vercellotti et al. ......... 340/10.5 |
| 5,986,562 | A | * | 11/1999 | Nikolich ................... 340/693.5 |
| 2002/0070863 | A1 | * | 6/2002 | Brooking ................. 340/572.1 |
| 2004/0124969 | A1 | * | 7/2004 | Okada ........................ 340/5.72 |
| 2005/0001712 | A1 | * | 1/2005 | Yarbrough ................. 340/5.82 |
| 2006/0001527 | A1 | * | 1/2006 | Dvorak et al. .............. 340/10.3 |

* cited by examiner

*Primary Examiner*—Benjamin C Lee
*Assistant Examiner*—Curtis J King
(74) *Attorney, Agent, or Firm*—Dickstein Shapiro LLP

(57) ABSTRACT

An active radio tag including a card holder. The card holder has built therein a memory having stored therein a tag ID and a transmission unit that transmits the tag ID by radio. In addition, the card holder includes a card placement section in which a card is to be placed and a card detection switch that detects the card. Only when the placement of the card in the card placement section is detected by the card detection switch, the radio tag is activated and the tag ID is transmitted.

9 Claims, 18 Drawing Sheets

ACTIVE RADIO TAG, SECURITY MANAGEMENT SYSTEM, AND SECURITY MANAGEMENT METHOD

BACKGROUND OF THE INVENTION

1. Field of the Invention

The present invention relates to an active radio tag for use in entering and leaving management, presence management, and the like, and a security management system and a security management method that use the active radio tag.

2. Description of the Related Art

A radio tag is a contactless medium which has an ID (identification number) unique to the tag stored in its built-in memory and performs communication by radio with a receiver, and is generally called an RFID (Radio Frequency Identification) tag. Radio tags come in two types: passive and active. A passive radio tag does not contain therein an energy source (battery) and performs communication by driving an internal circuit based on electromagnetic energy obtained from a receiver within a predetermined area. On the other hand, an active radio tag contains therein an energy source (battery) and performs communication without the need of electromagnetic energy from a receiver.

In an active radio tag, a tag ID is automatically transmitted regardless of areas and thus the active radio tag is mainly used for presence management for persons or items, and the like. In addition, by encrypting a tag ID, an active radio tag can also be used for applications intended to restrict access, e.g., management of entering and leaving the room, management of using equipment, and the like. On the other hand, in a passive radio tag, its usable-areas are limited and thus the passive radio tag is mainly used for management of entering and leaving the room, management of using equipment, and the like. For example, a contactless IC card for use in management of entering and leaving the room is a kind of passive radio tag. For storage media for access restriction, in addition to a contactless IC card, a contact IC card and a magnetic card are also used.

As such, since there are two types of storage media having different purposes of use, a combined operation can be considered such as, for example, using an active radio tag for presence management for persons within premises and access management for specific location and equipment and using a card for other access management. In this case, a user needs to have two types of storage media; however, in terms of security, it is desirable that a single ID be provided to a single person. In addition, these storage media should essentially be possessed by the same single person. However, in the present circumstances, since a radio tag and a card can be operated separately, if only the radio tag is handed over to and used by another person, an illegal action can occur, such as the target of presence management becoming another person or another person using the radio tag and accessing specific location and equipment; accordingly, there is a security problem.

Japanese Patent Application Laid-Open No. 8-97777 describes a portable communication apparatus including a main body case in which an IC card having stored therein ID data unique to an owner can be placed and operation means and communication means which are provided to the main body case, in which when the operation means is operated the ID data stored in the IC card placed in the main body case is transmitted through the communication means. However, a technique disclosed in Japanese Patent Application Laid-Open No. 8-97777 is to enable transmission, by radio, of information stored in an IC card without processing the IC card itself and thus the target of operation is only an IC card and the technique is not about the combined use of a radio tag and an IC card. Therefore, with the technique disclosed in Japanese Patent Application Laid-Open No. 8-97777, the above-described problem which arises when different storage media are operated in combination cannot be solved.

SUMMARY OF THE INVENTION

As described above, in conventional techniques, when different storage media are operated in combination, since the media can be operated separately, there is a security problem. The present invention is made to solve the problem. An object of the present invention is to improve security for a combined operation of two types of storage media.

Active radio tags of the present invention include a radio tag according to a first invention and a radio tag according to a second invention.

The active radio tag according to the first invention includes: a storage unit having stored therein a tag ID; a transmission unit that transmits, by radio, the tag ID in a predetermined signal form; a card holder having the storage unit and the transmission unit built therein and including a card placement section in which a card is to be placed; and a detection unit that detects a card placed in the card holder. When the detection unit detects a card, transmission of the tag ID is allowed and when the detection unit does not detect a card, transmission of the tag ID is prohibited.

In the first invention, only when the card is placed in the card holder, the radio tag is activated and the tag ID is transmitted. When the card is not placed in the card holder, the radio tag is not activated and thus the tag ID is not transmitted. Therefore, since the functions of the radio tag become effective only when the radio tag and the card are used together, even when the radio tag and the card are separated from each other and only the radio tag is handed over to another person, unless the card is placed in the radio tag, the tag ID is not transmitted. Accordingly, the occurrence of erroneous presence management, illegal actions, and the like are prevented, and security is improved.

The active radio tag according to the second invention includes: a storage unit having stored therein a tag ID; a transmission unit that transmits, by radio, the tag ID in a predetermined signal form; a card holder having the storage unit and the transmission unit built therein and including a card placement section in which a card is to be placed; a detection unit that detects a card placed in the card holder; a reading unit that reads card information stored in the card detected by the detection unit; and a determination unit that checks the card information read by the reading unit against the tag ID to determine whether the card is a right card. When the detection unit detects a card, if the determination unit determines that the card is right, then transmission of the tag ID is allowed, and if the determination unit determines that the card is not right, then transmission of the tag ID is prohibited. When the detection unit does not detect a card, transmission of the tag ID is prohibited.

In the second invention, only when a card is placed in the card holder and the card is the right card associated with the tag ID, i.e., the card is the card of the owner of the radio tag, the radio tag is activated and the tag ID is transmitted. When a card is not placed in the card holder or when, though a card is placed in the card holder, the card is not the card of the owner of the radio tag, the radio tag is not activated and thus the tag ID is not transmitted. Therefore, since the functions of the radio tag become effective only when the radio tag and the card of the owner of the radio tag are used together, even when the radio tag and the card are separated from each other and only the radio tag is handed over to another person, unless the card of the owner of the radio tag is placed in the radio tag, the tag ID is not transmitted. In addition, even if a card of another person is placed in the radio tag, the card is not the card of the owner of the radio tag and thus is not determined to be the right card; accordingly, the tag ID is not transmitted. Hence, the occurrence of erroneous presence management, illegal actions, and the like is more strongly prevented, making it possible to further enhance security.

In the first invention, the card holder includes an operation section and the transmission unit transmits the tag ID in different signal forms for different cases, a case in which the operation section is operated and a case in which the operation section is not operated. When the operation section is operated, if the detection unit detects a card, then transmission of the tag ID in a first signal form is allowed, and if the detection unit does not detect a card, then transmission of the tag. ID in the first signal form is prohibited. When the operation section is not operated, regardless of whether there is a card, transmission of the tag ID in a second signal form is allowed. For example, the first signal form is a form of a signal in which the tag ID is encrypted and the second signal form is a form of a signal in which the tag ID is not encrypted.

According to this, the following operation can be performed. Specifically, in the case, for example, of management of entering and leaving the room that requires a high degree of security, presence management is performed such that on conditions that the operation section is operated on the radio tag and a card is placed, a tag ID is transmitted in the first signal form and when the operation section is not operated, regardless of whether a card is placed, a tag ID is transmitted in the second signal form. In addition, it becomes possible to separately use access management and presence management using a single radio tag.

In one aspect of the second invention, the card holder includes an operation section and the transmission unit transmits the tag ID in different signal forms for different cases, a case in which the operation section is operated and a case in which the operation section is not operated. When the operation section is operated with a card being detected by the detection unit, if the determination unit determines that the card is right, then transmission of the tag ID in a first signal form is allowed, and if the determination unit determines that the card is not right, then transmission of the tag ID in the first signal form is prohibited. When the operation section is not operated, regardless of whether there is a card and whether the card is right, transmission of the tag ID in a second signal form is allowed. For example, the first signal form is a form of a signal in which the tag ID is encrypted and the second signal form is a form of a signal in which the tag ID is not encrypted.

According to this, the following operation can be performed. Specifically, in the case of management of entering and leaving the room that requires a high degree of security, presence management is performed such that on conditions that the operation section is operated on the radio tag and the right card is placed, a tag ID is transmitted in the first signal form and when the operation section is not operated, regardless of whether a card is placed or whether the card is right, a tag ID is transmitted in the second signal form. In addition, it becomes possible to separately use access management and presence management using a single radio tag.

In the active radio tags of the present invention, the number of times the card is removed from the card holder may be counted based on results of detection by the detection unit, and when the number of removals has reached a predetermined value, some or all of functions of the radio tag may be suspended. By doing so, in the case in which a radio tag and a card are separated from each other and only the radio tag is lent to another person, when the number of times has reached the predetermined value, the radio tag stops functioning, and thus, illegal use of the radio tag by another person can be limited.

When the functions of the radio tag are suspended in the above-described manner, function suspension may be cancelled based on a special command. An operation for the cancellation is performed by a person in charge of the radio tag, for example. By this, the functions of the radio tag are recovered and thus the tag can be used again.

A security management system of the present invention includes: any of the above-described active radio tags; a receiving unit that receives a tag ID transmitted from the radio tag; and an authentication unit that performs predetermined authentication based on the tag ID received by the receiving unit.

In this system, by using any of the active radio tags of the present invention, the occurrence of erroneous presence management, illegal actions, and the like are prevented, as described above, and security is improved.

In the case of using an active radio tag including the above-described operation section, a security management system of the present invention includes: the active radio tag; a receiving unit that receives a tag ID transmitted from the radio tag; an access management unit that grants or denies access to a predetermined access target based on a tag ID in a first signal form received by the receiving unit; and a presence management unit that manages presence of the radio tag based on a tag ID in a second signal form received by the receiving unit.

According to this, the following operation can be performed. Specifically, in the case of management of entering and leaving the room that requires a high degree of security, presence management is performed such that on conditions that the operation section is operated on the radio tag and a card is placed, a tag ID is transmitted in the first signal form and when the operation section is not operated, regardless of whether a card is placed, a tag ID is transmitted in the second signal form. In addition, it becomes possible to separately use access management and presence management using a single radio tag.

A security management method of the present invention includes: transmitting a tag ID from any of the above-described active radio tags; receiving, by a receiving unit, the tag ID transmitted from the radio tag; and performing, by an authentication unit, predetermined authentication based on the tag ID received by the receiving unit.

In this method, by using any of the active radio tags of the present invention, the occurrence of erroneous presence management, illegal actions, and the like are prevented, as described above, and security is improved.

In the case of using an active radio tag including the above-described operation section, a security management method of the present invention includes: transmitting a tag ID from the active radio tag; receiving, by a receiving unit, the tag ID transmitted from the radio tag; granting or denying, by an access management unit, access to a predetermined access target based on a tag ID in a first signal form received by the receiving unit; and managing, by a presence management unit, presence of the radio tag based on a tag ID in a second signal form received by the receiving unit.

According to this, the following operation can be performed. Specifically, in the case of management of entering and leaving the room that requires a high degree of security, presence management is performed such that on conditions that the operation section is operated on the radio tag and a card is placed, a tag ID is transmitted in the first signal form and when the operation section is not operated, regardless of whether a card is placed, a tag ID is transmitted in the second signal form. In addition, it becomes possible to separately use access management and presence management using a single radio tag.

According to the present invention, it prevents different storage media from being separated from each other and used illegally and accordingly security for a combined operation of the media can be improved.

DETAILED DESCRIPTION OF THE PREFERRED EMBODIMENTS

Figure 1:
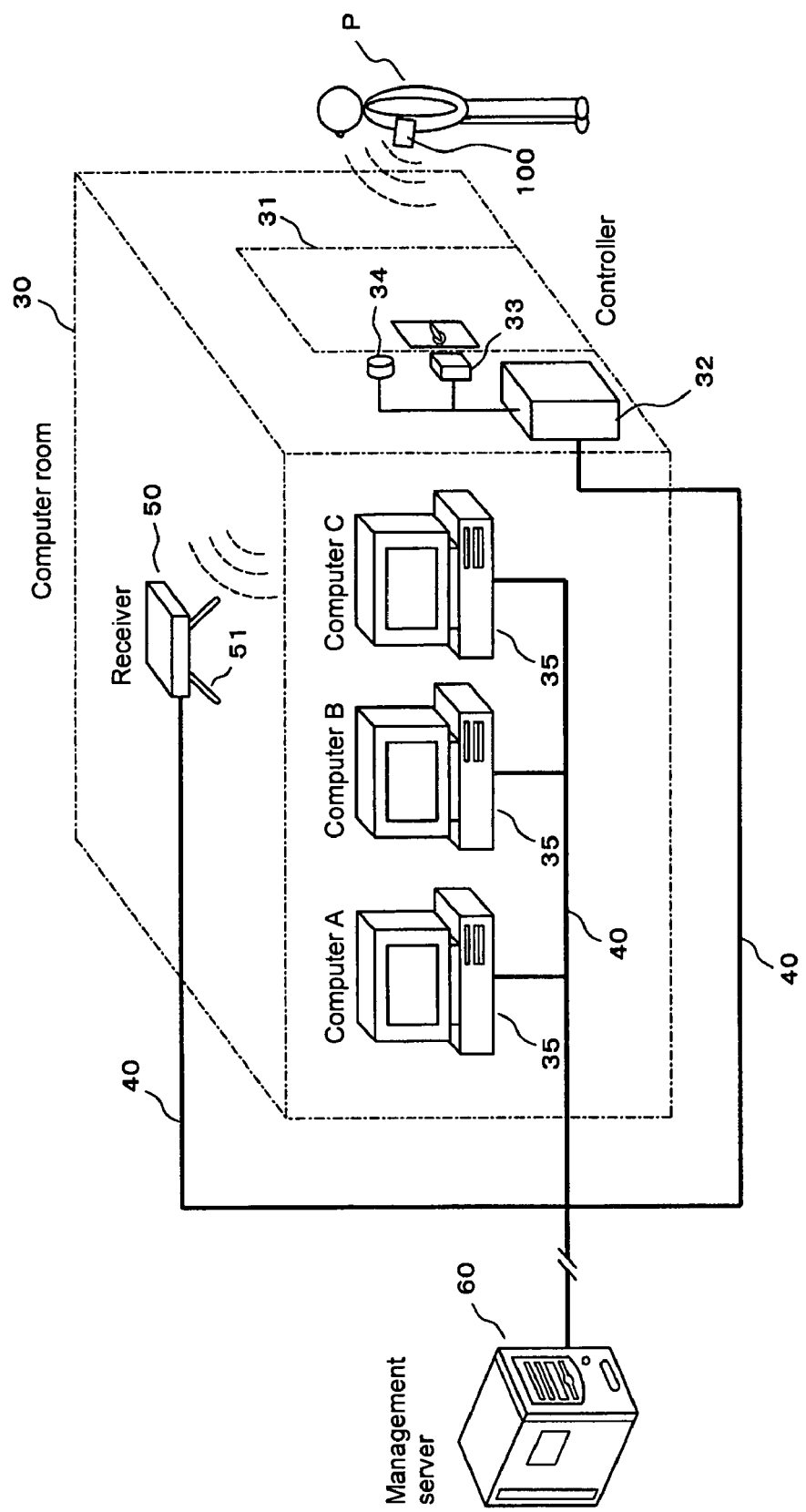
FIG. 1 shows a diagram showing an example of a security management system to which the present invention is applied.

Embodiments of the present invention will be described below with reference to the drawings. FIG. 1 is a diagram showing an example of a security management system to which the present invention is applied. Reference numeral 30 denotes a computer room, reference numeral 31 denotes a door to the entrance of the computer room 30, reference numeral 32 denotes a controller that controls an electric lock 33 and an alarm apparatus 34 which are provided in the vicinity of the door 31, and reference numeral 35 denotes a computer set up in the computer room 30. Reference numeral 100 denotes an active radio tag (hereinafter, simply referred to as the "radio tag") possessed by a user P and reference numeral 50 denotes a receiver that receives information transmitted from the radio tag 100. Reference numeral 60 denotes a management server that performs access management for access targets, such as the computer room 30 and the computers 35, and performs presence management for the user P. The receiver 50, the management server 60, the computers 35, and the controller 32 are connected to one another via a network 40 such as Ethernet (registered trademark). The receiver 50 is provided on a ceiling of the computer room 30, for example, and has antennas 51 that receive information transmitted from the radio tag 100. In addition, the receiver 50 has a receiving circuit, a demodulation circuit, a memory, a communication control section, and the like (not shown). The management server 60 has a CPU, a memory, a hard disk, a communication control section, and the like (not shown) and is set up in a management room, for example. The management server 60 is also connected, via a network, to other rooms than the computer room 30 and exchanges data with receivers and equipment provided in the respective rooms, as in the case of the computer room 30.

In the above, the receiver 50 composes one embodiment of a receiving unit in the present invention and the management server 60 composes one embodiment of an authentication unit, an access management unit, and a presence management unit in the present invention. A specific operation mode of the security management system in FIG. 1 will be described later in the following embodiments.

Figure 2:
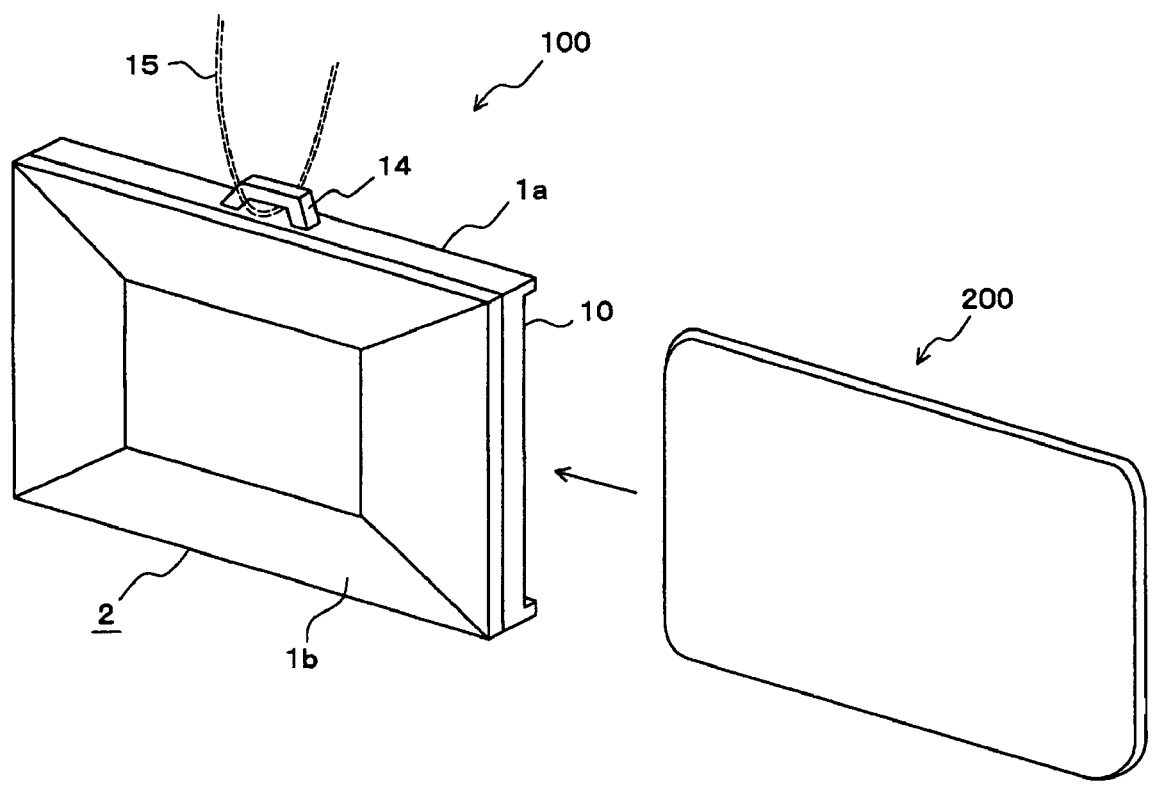
FIG. 2 shows an external view of a radio tag as seen from the back side thereof, according to a first embodiment of the present invention.

FIGS. 2 to 7 show a first embodiment of the present invention. FIG. 2 is an external view of a radio tag 100 as seen from the back side thereof. The radio tag 100 includes a resin case 1a and a resin cover 1b which covers the case 1a. By the case 1a and the cover 1b, a card holder 2 is composed. On a top face of the case 1a is integrally formed a cord-threading section 14 for threading a cord 15. The cord 15 is used to hang the card holder 2 from the user's neck. On the front side of the case 1a is provided a card placement section 10 for placing a card 200. As such, since the radio tag 100 also serves as a card holder, two storage media, i.e., a tag and a card, can be physically integrated, providing convenience in handling.

Figure 3A:
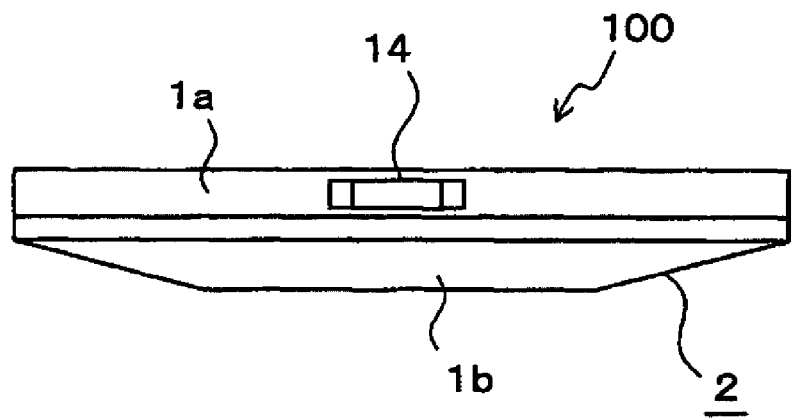
FIG. 3A shows a top view of the radio tag and FIG. 3B shows a front view of the radio tag as seen from the back side thereof with a cover being removed.
Figure 3B:
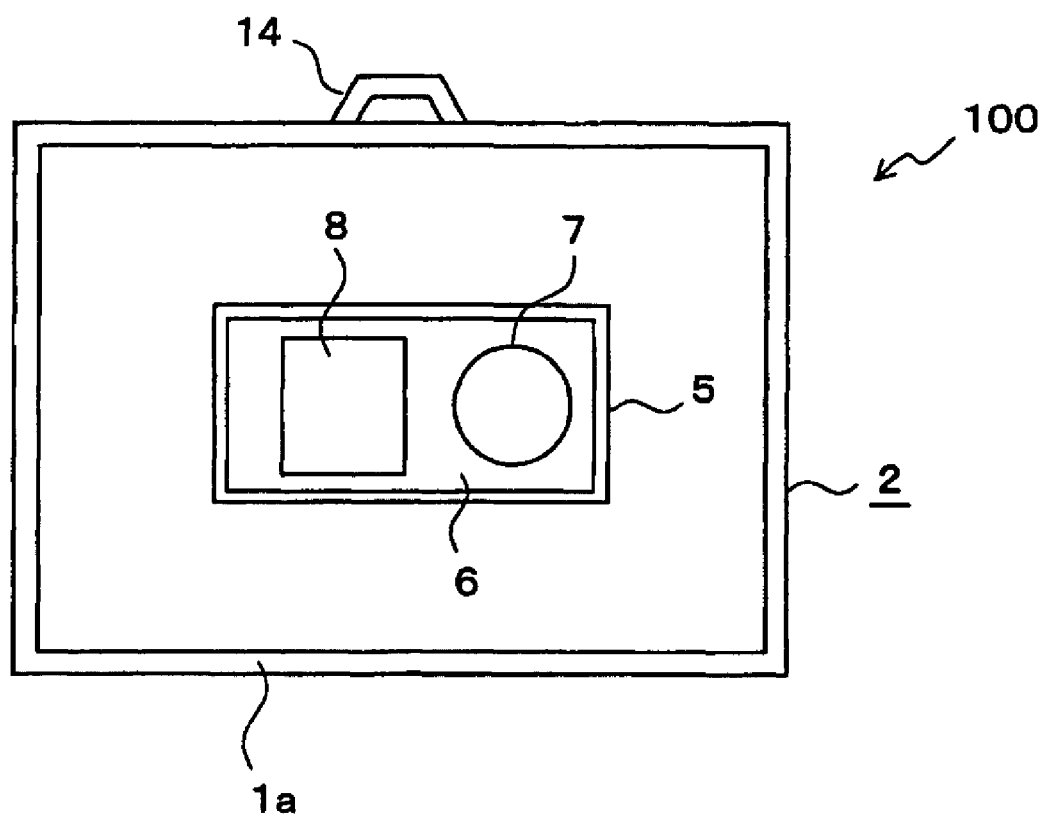

FIG. 3A is a top view of the radio tag 100 and FIG. 3B is a front view of the radio tag 100 as seen from the back side (the lower side in FIG. 3A) of the case 1a with the cover 1b being removed. As shown in FIG. 3B, a board accommodation section 5 composed of surrounding walls is provided inside the case 1a and a circuit board 6 is accommodated in the board accommodation section 5. The circuit board 6 has a power supply section (battery) 7 and a circuit section 8 mounted thereon.

Figure 4:
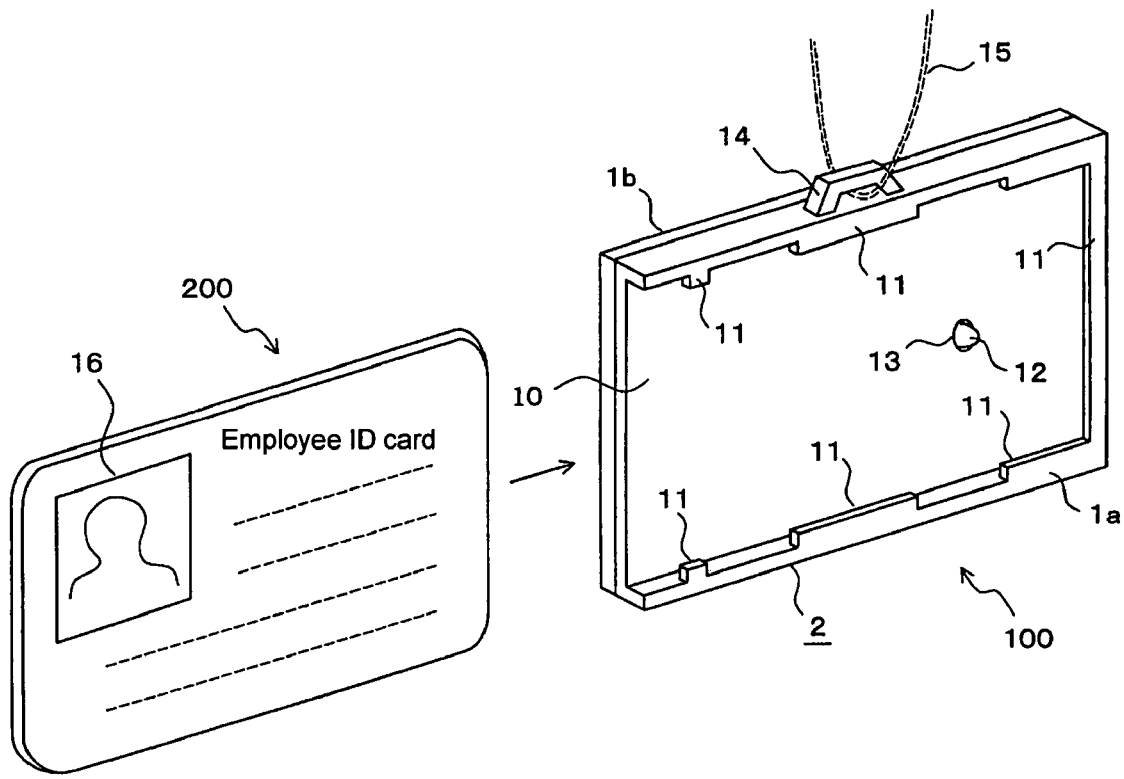
FIG. 4 shows an external view of the radio tag as seen from the front side thereof.

FIG. 4 is an external view of the radio tag 100 as seen from the front side thereof. The card placement section 10 is formed in a recess shape and a plurality of protrusions 11 for holding a card are provided on the periphery of the card placement section 10. A card 200 is made of a contactless IC card, for example. Here, as an example of the card 200, a card that also serves as an employee ID card is used. Reference numeral 16 denotes a photo of a user printed on the card 200. The card 200 is used, for example, when the user enters and leaves a location (e.g., a laboratory) where a card reader is set up or when the user uses equipment (e.g., a measuring device) with a card reader attached thereto.

Figure 5:
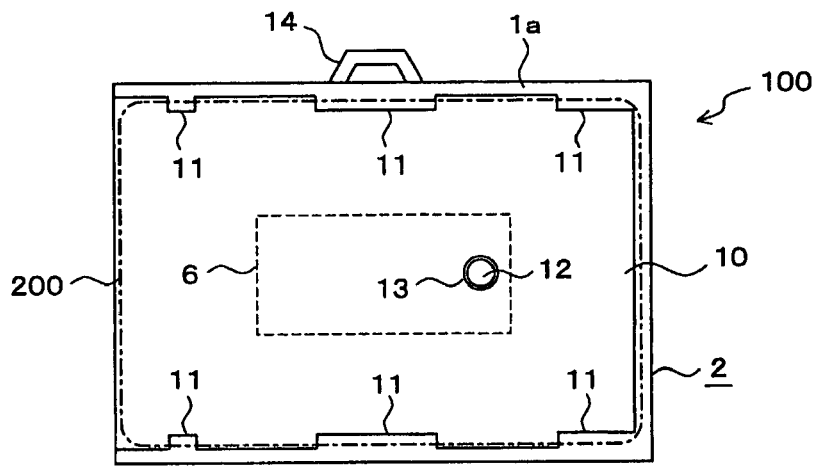
FIG. 5 shows a front view of the radio tag as seen from the front side thereof.

The card 200 is inserted into the card placement section 10 from a direction indicated by an arrow in FIG. 4 and placed in the card holder 2 in a state such as the one shown by a dash-dotted line in FIG. 5. At this time, the protrusions 11 prevent the card 200 from coming off the card placement section 10. The card placement section 10 has a see-through hole 13 provided therein. From the see-through hole 13 is projected a part of a card detection switch 12. The switch 12 is used to detect the placement of the card 200 in the card placement section 10 and provided on a surface opposite to a surface where the power supply section 7 and the like of the circuit board 6 are mounted.

Figure 6:
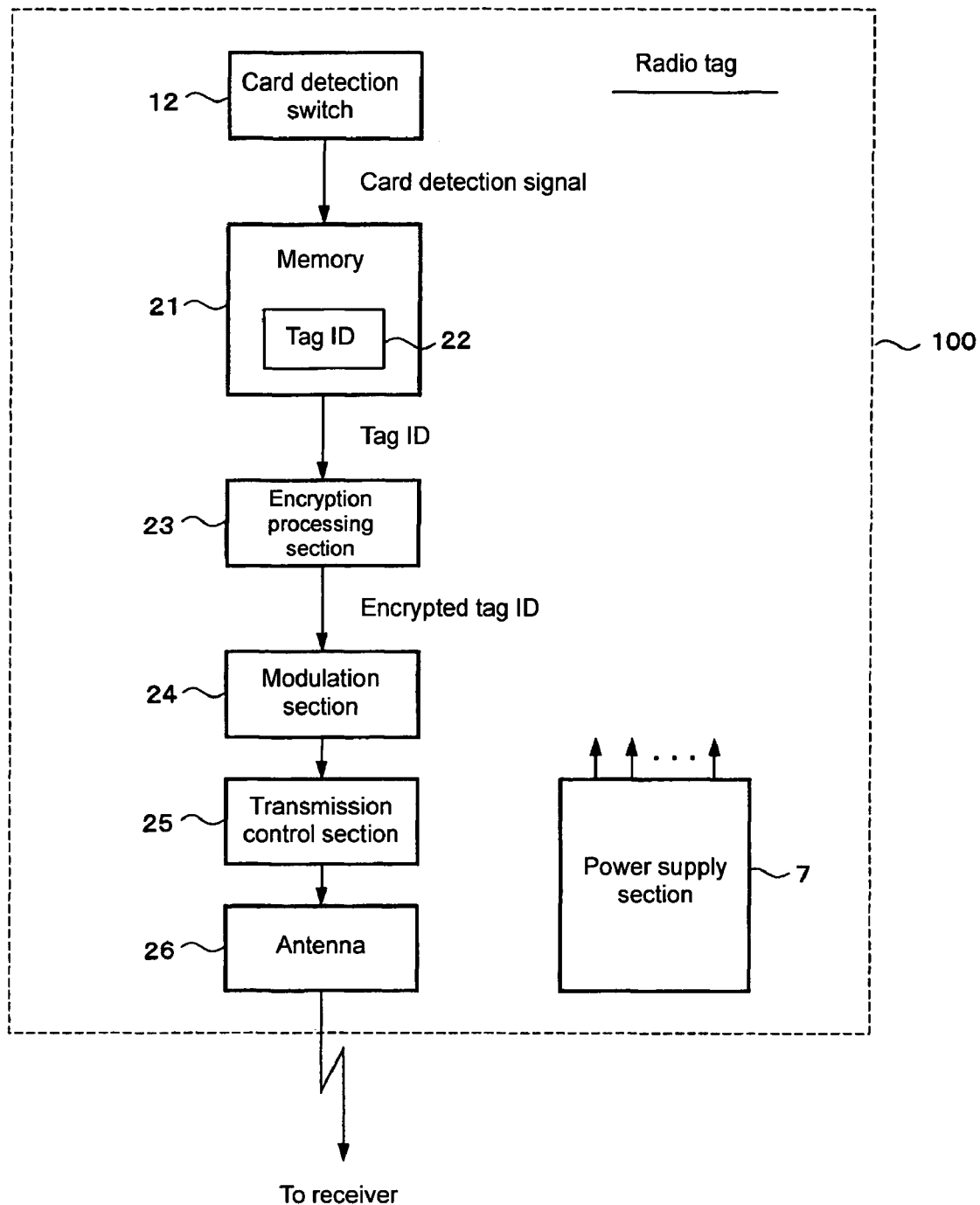
FIG. 6 shows a block diagram showing an electrical configuration of the radio tag.

FIG. 6 is a block diagram showing an electrical configuration of the radio tag 100. Reference numeral 12 denotes the aforementioned card detection switch. The card detection switch 12 outputs, when the card 200 is placed in the card placement section 10, a detection signal indicating that there is a card and outputs, when the card 200 is not placed in the card placement section 10, a detection signal indicating that there is no card. Reference numeral 21 denotes a memory having stored therein a tag ID 22 unique to the radio tag 100. The tag ID 22 is stored in 7-digit plain text, for example. Reference numeral 23 denotes an encryption processing section that encrypts the tag ID 22 according to a predetermined encryption algorithm. Reference numeral 24 denotes a modulation section that modulates the encrypted tag ID. Reference numeral 25 denotes a transmission control section that performs transmission control of a modulated wave to be outputted from the modulation section 24. Reference numeral 26 denotes an antenna that transmits the modulated wave based on the control by the transmission control section 25. The blocks 21 and 23 to 26 compose the circuit section 8 in FIG. 3B. Reference numeral 7 denotes the aforementioned power supply section and the power supply section 7 supplies power to each section at all times. Note that the encryption processing section 23 may be omitted.

In the above, the memory 21 composes one embodiment of a storage unit in the present invention, the modulation section 24, the transmission control section 25, and the antenna 26 compose one embodiment of a transmission unit in the present invention, and the card detection switch 12 composes one embodiment of a detection unit in the present invention.

Figure 7:
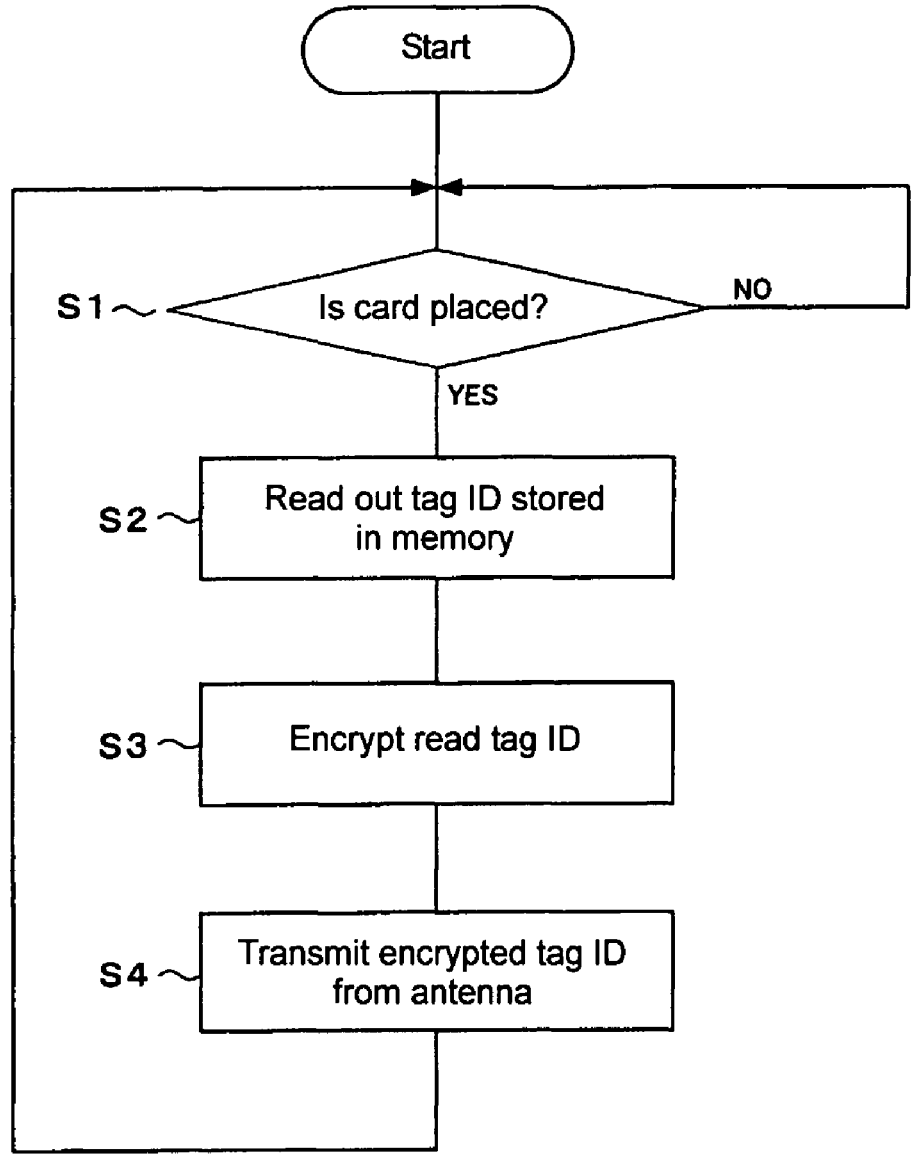
FIG. 7 shows a flowchart showing an operation of the radio tag.

FIG. 7 is a flowchart showing an operation of the radio tag 100 according to the first embodiment. At step S1, it monitors whether the card 200 is placed in the radio tag 100, based on an output from the card detection switch 12. If the card 200 is placed (YES at step S1), then the process proceeds to step S2 and subsequent steps thereto, to activate the radio tag 100. If the card 200 is not placed (NO at step S1), then the process does not proceed to step S2 and subsequent steps thereto and a monitoring state is maintained.

At step S2, the tag ID 22 stored in the memory 21 is read out. At step S3, the read tag ID 22 is encrypted by the encryption processing section 23. Then, at step S4, the encrypted tag ID is transmitted through the modulation section 24, the transmission control section 25, and the antenna 26. After the tag ID is transmitted, the process returns to step S1. While the card 200 is being placed, steps S2 to S4 are repeated and the tag ID is transmitted from the radio tag 100 in a predetermined cycle.

As such, in the first embodiment, only when the card 200 is placed in the card holder 2, the radio tag 100 is activated and a tag ID is transmitted. When the card 200 is not placed in the card holder 2, the radio tag 100 is not activated and thus a tag ID is not transmitted. Therefore, since the functions of the radio tag 100 become effective only when the radio tag 100 and the card 200 are used together, even when the radio tag 100 and the card 200 are separated from each other and only the radio tag 100 is handed over to another person, unless the card 200 is placed in the radio tag 100, a tag ID is not transmitted. Accordingly, the occurrence of erroneous presence management, illegal actions, and the like are prevented, and security is improved.

Next, an exemplary operation of the system in FIG. 1 for the case of using the radio tag 100 according to the first embodiment will be described. A tag ID transmitted from the radio tag 100 having the card 200 placed therein is received by the receiver 50. When the receiver 50 receives the tag ID from the radio tag 100, the receiver 50 transmits the tag ID and its receiver ID to the management server 60. Based on the receiver ID and tag ID received from the receiver 50, the management server 60 determines whether to grant or deny access to a location (computer room 30) and equipment (computers 35) that are associated with the receiver ID. This determination is made by referring to an access management table (not shown) which is held by the management server 60. If, as a result of the determination, access is granted, then the management server 60 transmits an access grant signal to the controller 32 and the computers 35 through the network 40. If access is denied, then the management server 60 transmits an access denial signal to the controller 32 and the computers 35 through the network 40.

When the controller 32 receives an access grant signal from the management server 60, the controller 32 outputs an unlock signal to the electric lock 33. By the unlock signal, the electric lock 33 performs an unlock operation. When the computers 35 receive an access grant signal from the management server 60, the computers 35 perform processes such as login for allowing the computers to be used. By this, the user P can enter the computer room 30 through the door 31 and use the computers 35.

On the other hand, when the controller 32 receives an access denial signal from the management server 60, the controller 32 outputs a lock signal to the electric lock 33 and outputs an alarm signal to the alarm apparatus 34 which includes an alarm light, a buzzer, and the like. In response to the lock signal, the electric lock 33 performs a lock operation. In response to the alarm signal, the alarm apparatus 8 generates an alarm. By this, the user P cannot enter the computer room 30 through the door 31. When the computers 35 receive an access denial signal from the management server 60, the computers 35 do not perform processes for allowing the computers to be used.

In the above-described manner, only when the card 200 is placed in the radio tag 100, the user P can access a predetermined location (computer room 30) and predetermined equipment (computers 35). Here, although only the case is described in which the management server 60 authenticates access grant/denial, an operation is also possible in which the management server 60 performs presence management for the user P based on a tag ID transmitted from the radio tag 100 and a receiver ID of the receiver 50 having received the tag ID.

Figure 8:
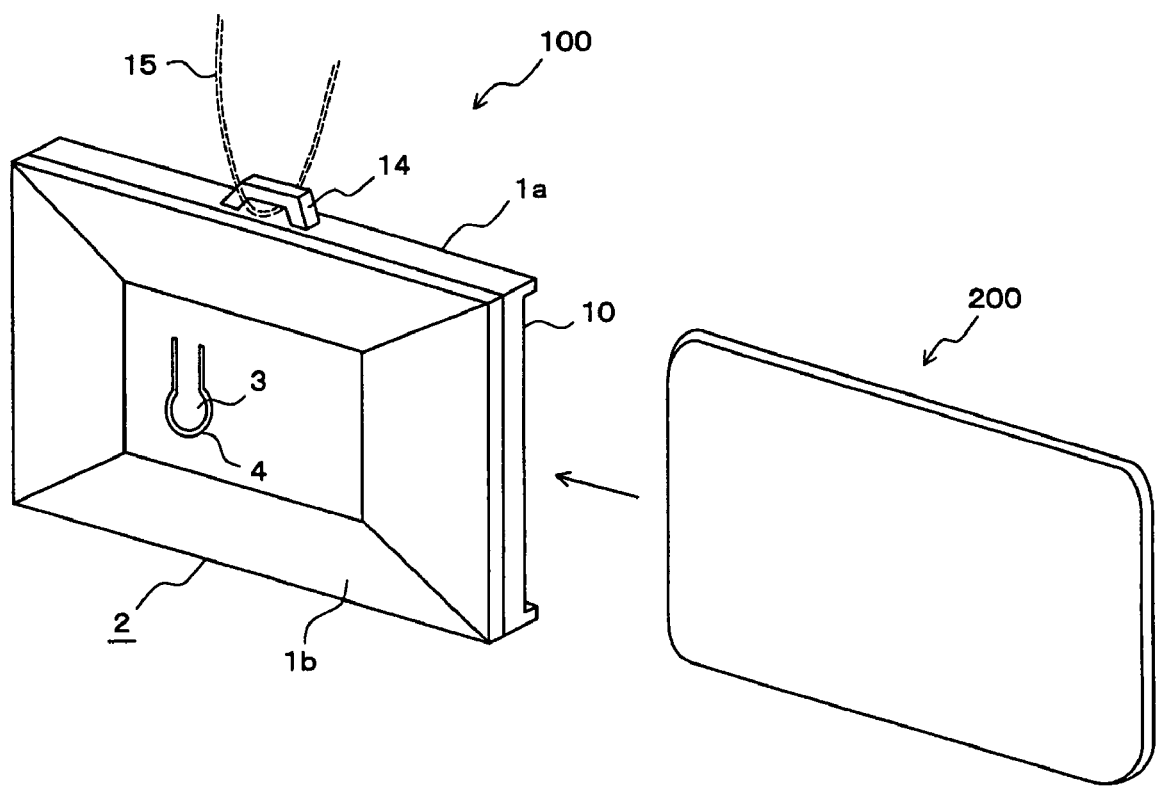
FIG. 8 shows an external view of a radio tag as seen from the back side thereof, according to a second embodiment of the present invention.

FIGS. 8 to 13 show a second embodiment of the present invention. FIG. 8 is an external view of a radio tag 100 as seen from the back side thereof. In FIG. 8, the same parts as those in FIG. 2 are denoted by the same reference numerals. In FIG. 8, in addition to the configuration in FIG. 2, an operation button 3 is integrally provided to a cover 1b. The operation button 3 is provided with resilience by a cut groove being provided in the periphery of the operation button 3. When the operation button 3 is pressed with a finger, the operation button 3 is pressed toward the inside of the cover 1b and thereby allows a button press detection switch 9, which will be described later, to operate. When the finger is released, the operation button 3 returns to its original state.

Figure 9A:
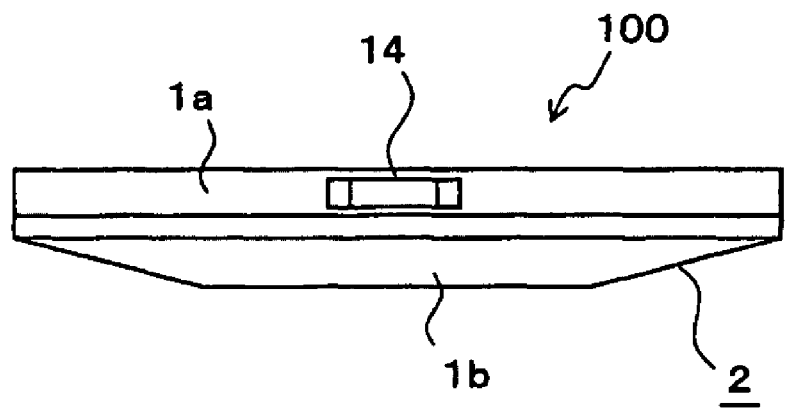
FIG. 9A shows a top view of the radio tag and FIG. 9B shows a front view of the radio tag as seen from the back side thereof with a cover being removed.
Figure 9B:
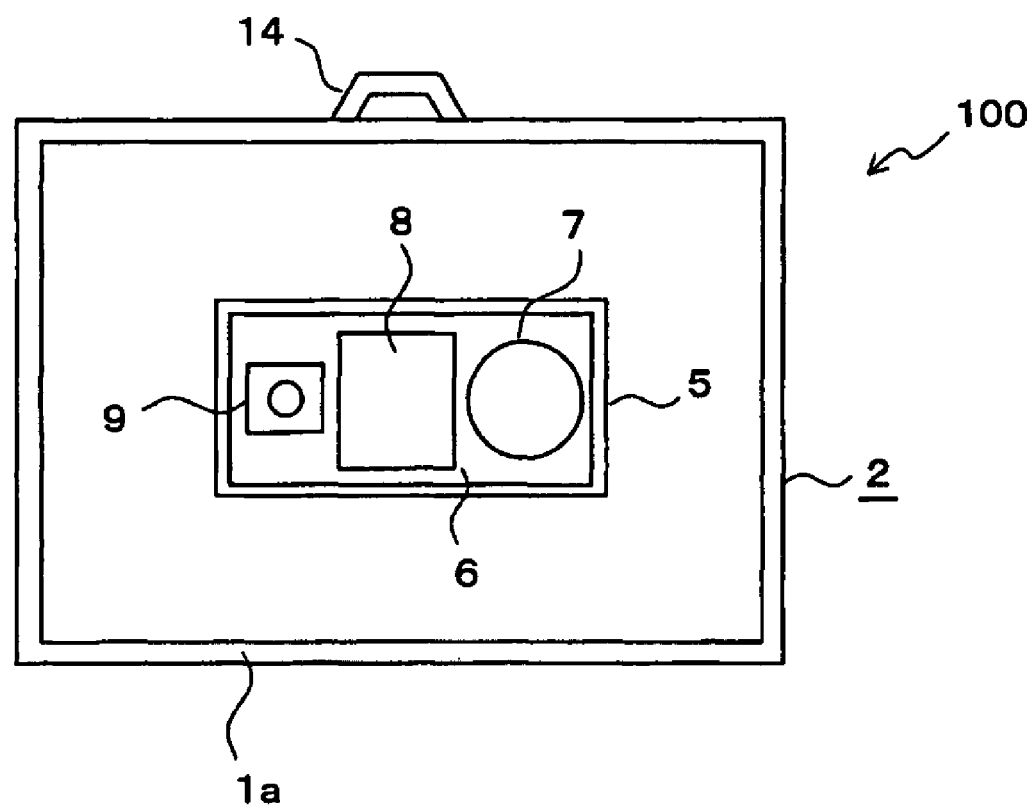

FIG. 9A is a top view of the radio tag 100 and FIG. 9B is a front view of the radio tag 100 as seen from the back side (the lower side in FIG. 9A) of a case 1a with the cover 1b being removed. In FIG. 9, the same parts as those in FIG. 3 are denoted by the same reference numerals. In FIG. 9B, in addition to the configuration in FIG. 3B, the button press detection switch 9 is provided to a circuit board 6. The button press detection switch 9 is used to detect the pressing of the operation button 3 and provided in a position facing the operation button 3.

Figure 10:
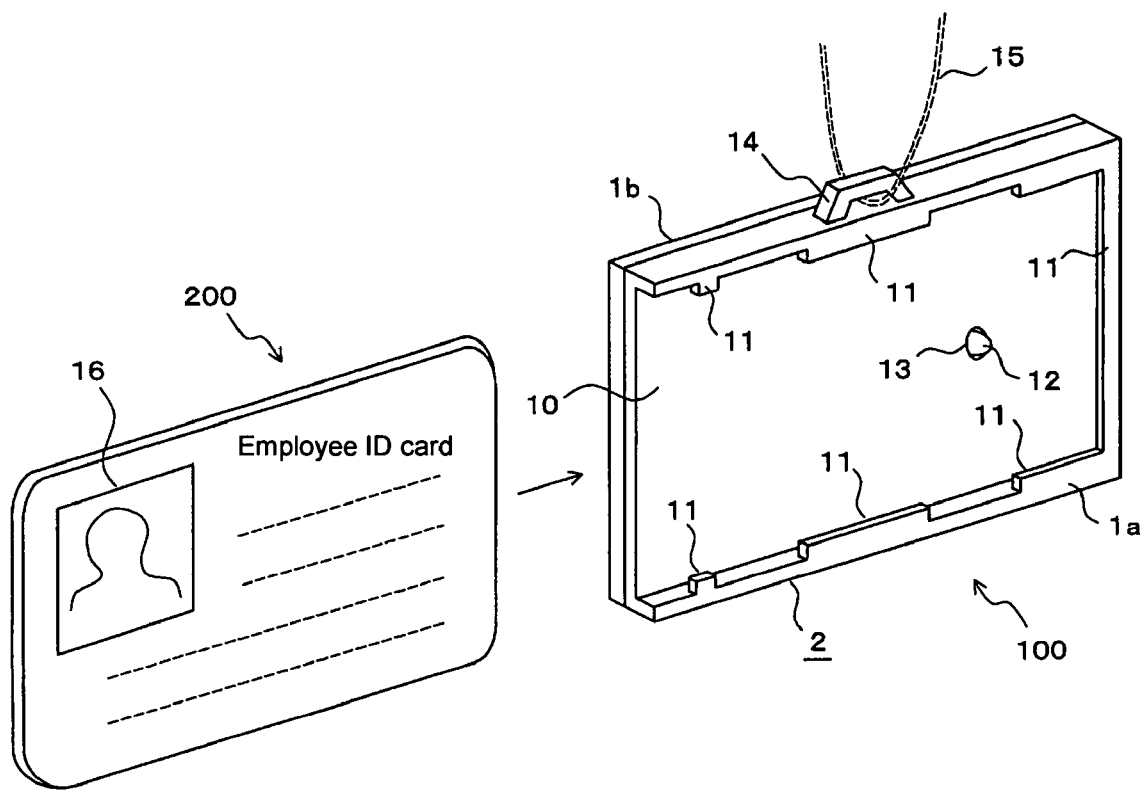
FIG. 10 shows an external view of the radio tag as seen from the front side thereof.
Figure 11:
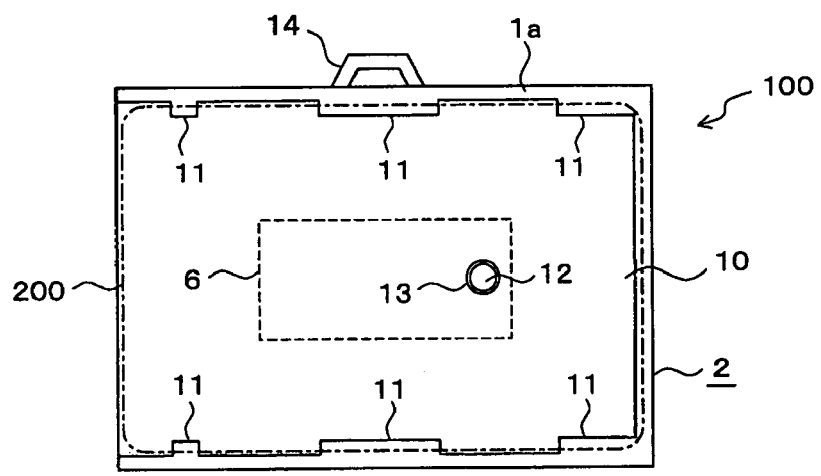
FIG. 11 shows a front view of the radio tag as seen from the front side thereof.

FIG. 10 is an external view of the radio tag 100 as seen from the front side thereof. FIG. 10 is substantially the same as FIG. 4 and thus the same parts as those in FIG. 4 are denoted by the same reference numerals. FIG. 11 is a diagram showing a state in which a card 200 is placed in a card placement section 10. FIG. 11 is substantially the same as FIG. 5 and thus the same parts as those in FIG. 5 are denoted by the same reference numerals.

Figure 12:
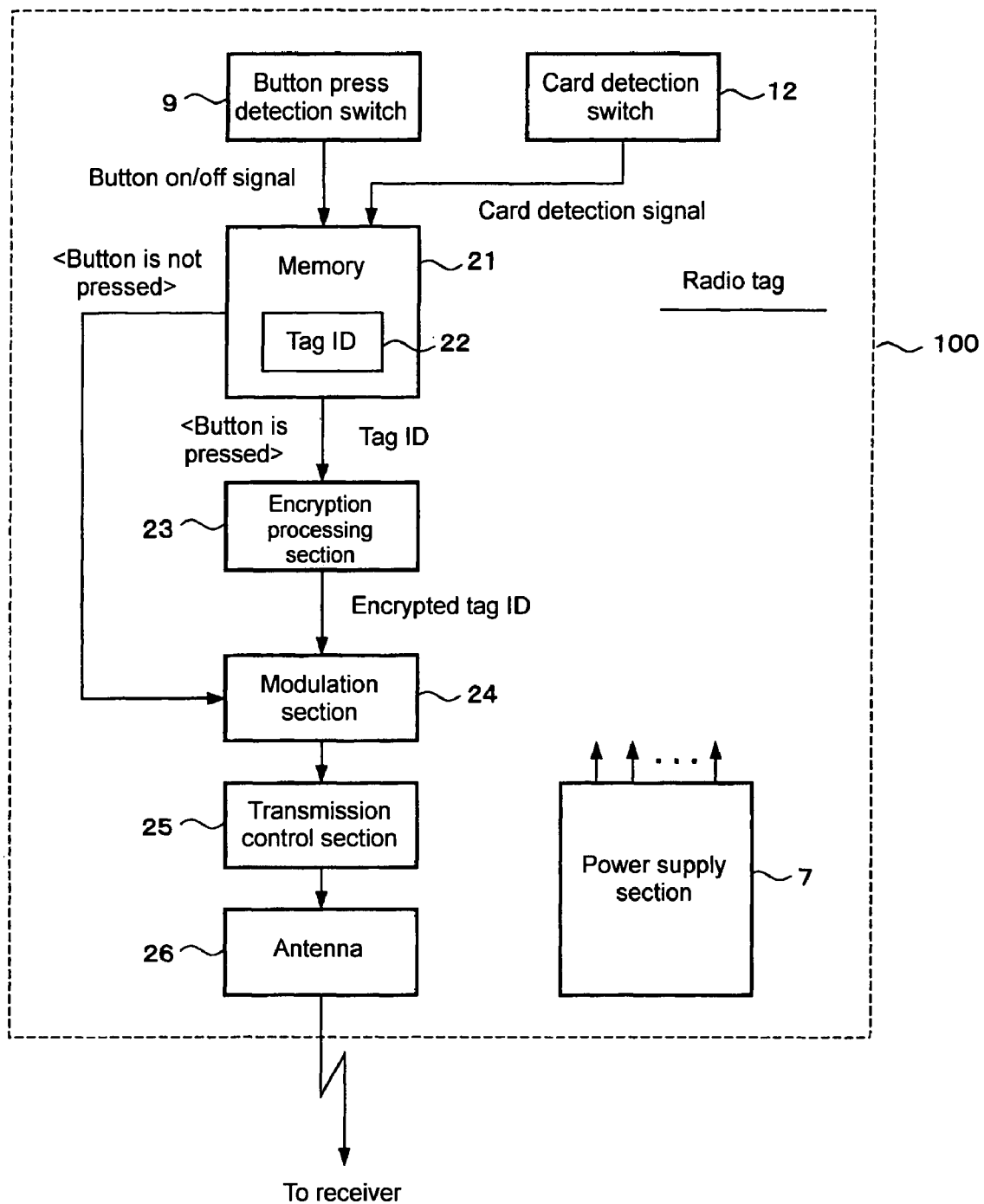
FIG. 12 shows a block diagram showing an electrical configuration of the radio tag.

FIG. 12 is a block diagram showing an electrical configuration of the radio tag 100. In FIG. 12, the same parts as those in FIG. 6 are denoted by the same reference numerals. Reference numeral 9 denotes the aforementioned button press detection switch. The button press detection switch 9 outputs a button ON signal when the operation button 3 is pressed and outputs a button OFF signal when the operation button 3 is not pressed. Reference numeral 12 denotes the aforementioned card detection switch. The card detection switch 12 outputs, when the card 200 is placed in the card placement section 10, a detection signal indicating that there is a card and outputs, when the card 200 is not placed in the card placement section 10, a detection signal indicating that there is no card. Reference numeral 21 denotes a memory having stored therein a tag ID 22 unique to the radio tag 100. The tag ID 22 is stored in 7-digit plain text, for example. When a button ON signal is outputted from the button press detection switch 9, the tag ID 22 read out from the memory 21 is provided to an encryption processing section 23. When a button OFF signal is outputted from the button press detection switch 9, the tag ID 22 read out from the memory 21 is provided to a modulation section 24. The encryption processing section 23 encrypts the tag ID 22 according to a predetermined encryption algorithm. The modulation section 24 modulates the encrypted tag ID. A transmission control section 25 performs transmission control of a modulated wave to be outputted from the modulation section 24. An antenna 26 transmits the modulated wave based on the control by the transmission control section 25. The blocks 21 and 23 to 26 compose a circuit section 8 in FIG. 9B. A power supply section 7 supplies power to each section at all times.

In the above, the memory 21 composes one embodiment of a storage unit in the present invention, the modulation section 24, the transmission control section 25, and the antenna 26 compose one embodiment of a transmission unit in the present invention, the operation button 3 composes one embodiment of an operation section in the present invention, and the card detection switch 12 composes one embodiment of a detection unit in the present invention.

Figure 13:
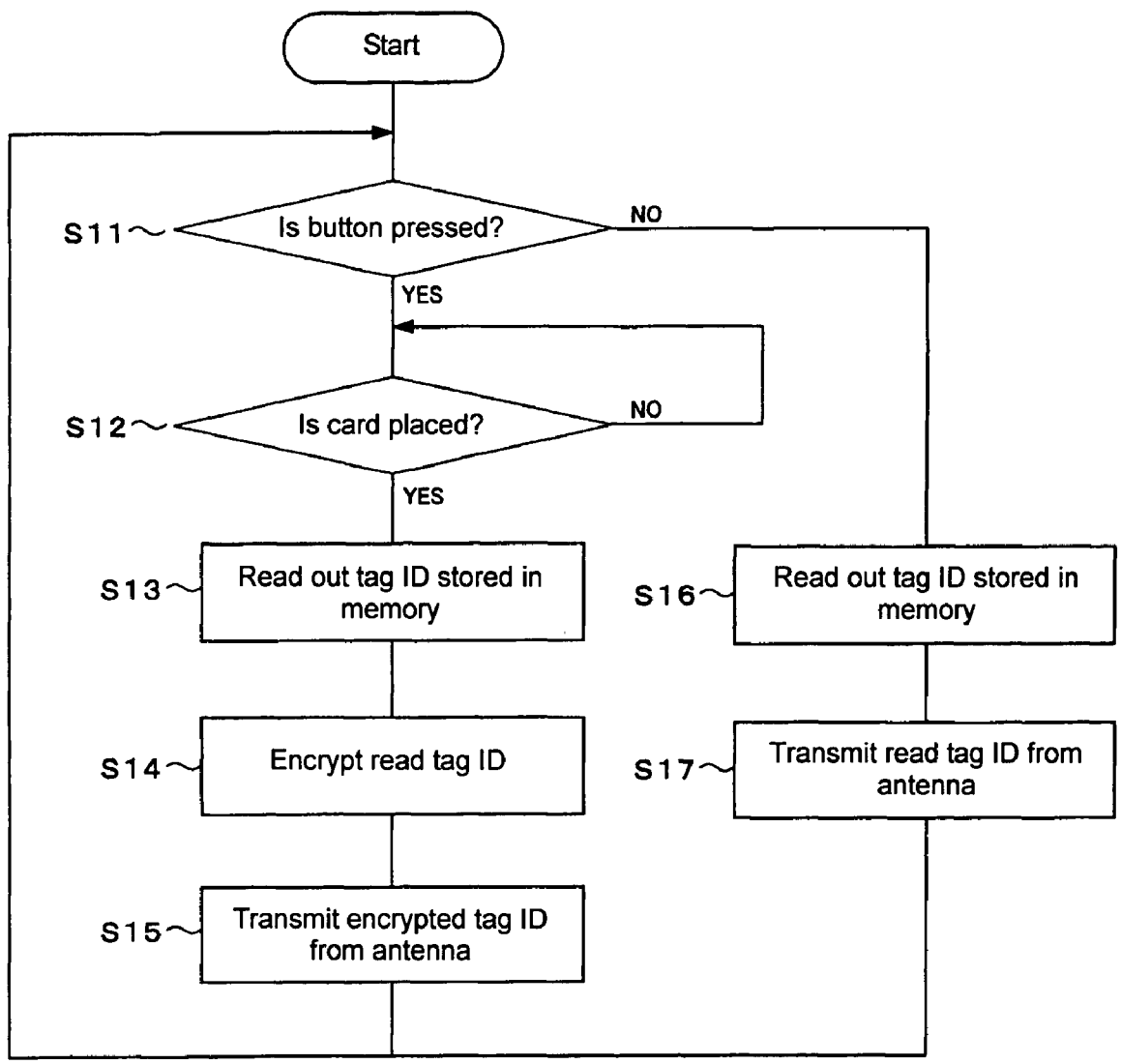
FIG. 13 shows a flowchart showing an operation of the radio tag.

FIG. 13 is a flowchart showing an operation of the radio tag 100 according to the second embodiment. At step S11, it monitors whether the operation button 3 is pressed, based on an output from the button press detection switch 9. If the operation button 3 is not pressed (NO at step S11), then the process moves to step S16 where the tag ID 22 stored in the memory 21 is read out. Then, at the next step S17, the read tag ID 22 is transmitted through the modulation section 24, the transmission control section 25, and the antenna 26. The tag ID in this case is transmitted in its original plain text form without being encrypted, and used for presence management.

On the other hand, if the operation button 3 is pressed (YES at step S11), then the process moves to step S12 where it determines whether the card 200 is placed in the radio tag 100, based on an output from the card detection switch 12. If the card 200 is placed (YES at step S12), then the process proceeds to step 13 and subsequent steps thereto, to activate the radio tag 100. If the card 200 is not placed (NO at step S12), then the process does not proceed to step S13 and subsequent steps thereto and waits for the card to be placed.

At step S13, the tag ID 22 stored in the memory 21 is read out. At step S14, the read tag ID 22 is encrypted by the encryption processing section 23. Then, at step S15, the encrypted tag ID is transmitted through the modulation section 24, the transmission control section 25, and the antenna 26. After the tag ID is transmitted, the process returns to step S11. While the operation button 3 is being pressed and the card 200 is being placed, steps S13 to S15 are repeated and the tag ID is transmitted from the radio tag 100 in a predetermined cycle. The tag ID in this case is encrypted and used for access management such as management of entering and leaving the room.

As such, in the second embodiment, the following operation can be performed. Specifically, in the case, for example, of management of entering and leaving the room that requires a high degree of security, presence management is performed such that on conditions that the operation button 3 is operated on the radio tag 100 and the card 200 is placed, a tag ID is encrypted and transmitted and when the operation button 3 is not operated, regardless of whether the card 200 is placed, a tag ID is transmitted in its original plain text form. In addition, it becomes possible to separately use access management and presence management using a single radio tag 100.

Next, an exemplary operation of the system in FIG. 1 for the case of using the radio tag 100 according to the second embodiment will be described. In a state in which the operation button 3 of the radio tag 100 is not pressed, a tag ID (a tag ID in plain text form without being encrypted) transmitted from the radio tag 100 is received by the receiver 50. When the receiver 50 receives the tag ID from the radio tag 100, the receiver 50 transmits the tag ID and its receiver ID to the management server 60. Based on the receiver ID and tag ID received from the receiver 50, the management server 60 performs presence management by determining and recording who is where. This management information is transmitted to a host server (not shown) if necessary.

When the operation button 3 of the radio tag 100 is pressed with the card 200 being placed, a transmitted tag ID (encrypted tag ID) is received by the receiver 50. Subsequent operational steps are the same as those for the first embodiment. Specifically, the receiver 50 transmits the received tag ID and a receiver ID to the management server 60. The management server 60 determines, based on the IDs, whether to grant or deny access to the computer room 30 and the computers 35. If access is granted, then an access grant signal is transmitted to the controller 32 and the computers 35 from the management server 60, whereby an unlock process for the electric lock 33 and a login process for the computers 35 are performed. Accordingly, the user P can enter the computer room 30 and use the computers 35. On the other hand, if access is denied, then an access denial signal is transmitted to the controller 32 and the computers 35 from the management server 60 and thus an unlock process for the electric lock 33 and a login process for the computers 35 are not performed. Accordingly, the user P cannot enter the computer room 30 and use the computers 35.

In the above-described manner, the user P can access a predetermined location (computer room 30) and predetermined equipment (computers 35) only when pressing the operation button 3 of the radio tag 100 with the card 200 being placed in the radio tag 100.

Figure 14:
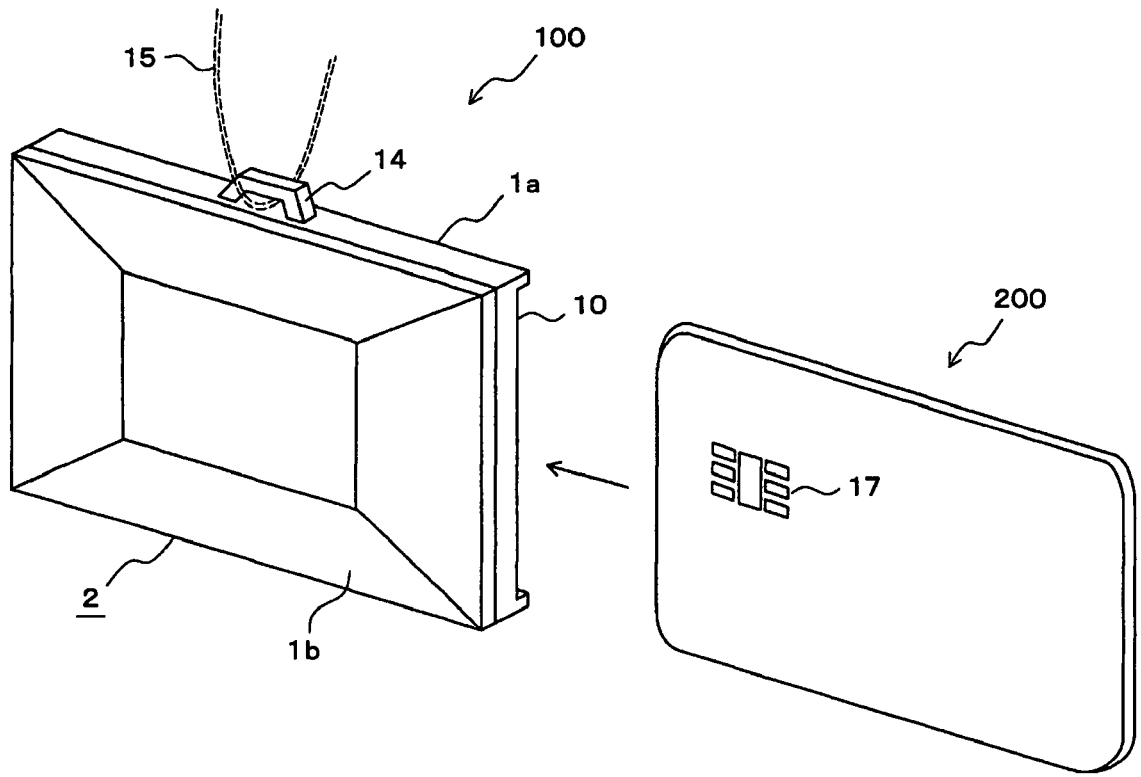
FIG. 14 shows an external view of a radio tag as seen from the back side thereof, according to a third embodiment of the present invention.

FIGS. 14 to 17 show a third embodiment of the present invention. FIG. 14 is an external view of a radio tag 100 as seen from the back side thereof. In FIG. 14, the same parts as those in FIG. 2 are denoted by the same reference numerals. In the present embodiment, a card 200 has a contact point 17. The contact point 17 is used to read card information stored in the card 200. Note that a card holder 2 has built therein a circuit board 6, a power supply section 7, and a circuit section 8 which are shown in FIG. 3B.

Figure 15:
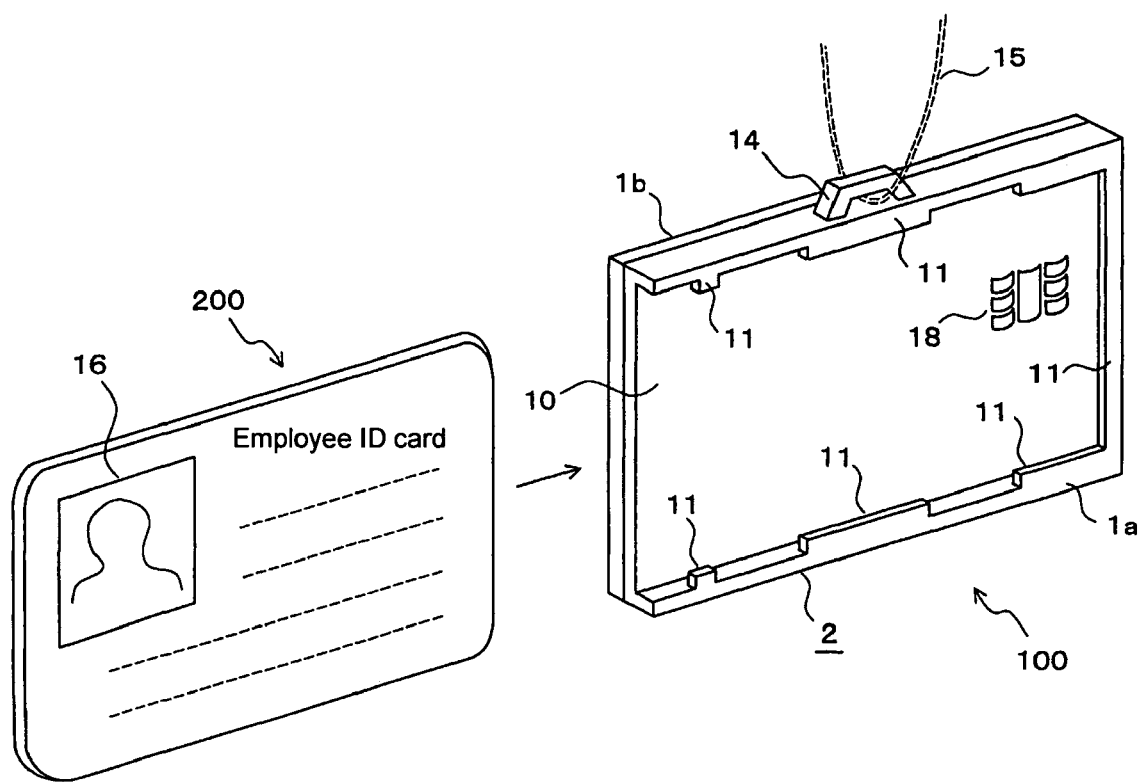
FIG. 15 shows an external view of the radio tag as seen from the front side thereof.

FIG. 15 is an external view of the radio tag 100 as seen from the front side thereof. In FIG. 15, the same parts as those in FIG. 4 are denoted by the same reference numerals. In FIG. 15, a contact 18 is provided instead of the card detection switch 12 in FIG. 4. The contact 18 is electrically connected to the circuit board.

Figure 16:
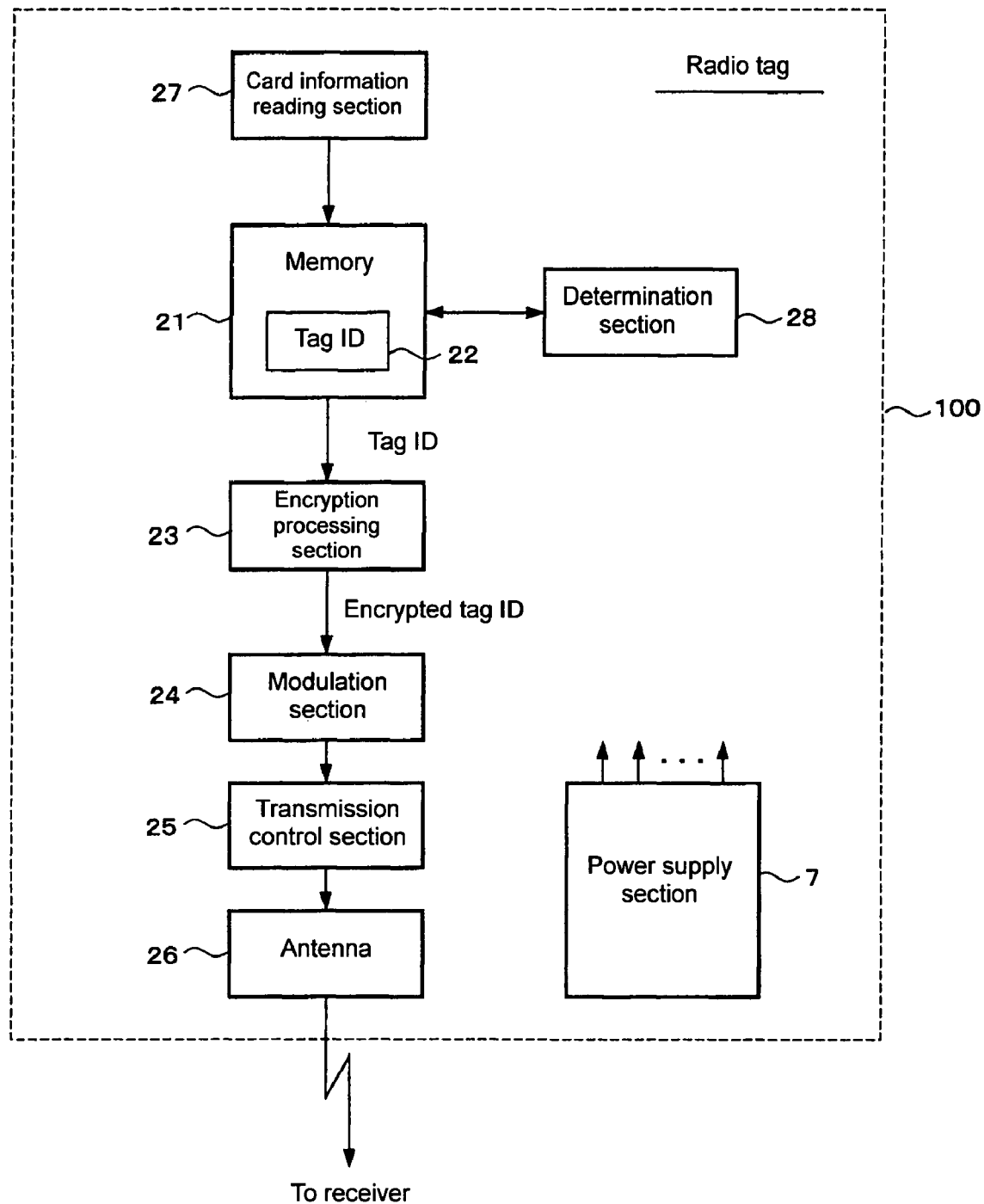
FIG. 16 shows a block diagram showing an electrical configuration of the radio tag.

FIG. 16 is a block diagram showing an electrical configuration of the radio tag 100. In FIG. 16, the same parts as those in FIG. 6 are denoted by the same reference numerals. Reference numeral 27 denotes a card information reading section including the aforementioned contact 18. The card information reading section 27 reads information stored in the card 200 in a state in which the card 200 is placed in a card placement section 10 and the contact point 17 of the card 200 is in contact with the contact 18. The card 200 has stored therein a card ID associated with a tag ID, as card information. The card ID is read by the card information reading section 27. The read card ID is temporarily stored in a memory 21. The card information reading section 27 also serves as a card detection section that detects whether there is a card, based on whether card information is able to be read. Reference numeral 21 denotes the memory having stored therein a tag ID 22 unique to the radio tag 100. The tag ID 22 is stored in 7-digit plain text, for example.

Reference numeral 28 denotes a determination section. The determination section 28 checks a card ID read by the card information reading section 27 against the tag ID 22 stored in the memory 21 to determine whether the card ID and the tag ID 22 are matched or whether the card ID and the tag ID 22 have a predetermined correspondence relationship. If the card ID and the tag ID 22 are matched or have the predetermined correspondence relationship, then the tag ID 22 is read out from the memory 21. If the card ID and the tag ID 22 are not matched or do not have the predetermined correspondence relationship, the tag ID 22 is not read out from the memory 21. The tag ID 22 read out from the memory 21 is provided to an encryption processing section 23. The encryption processing section 23 encrypts the tag ID 22 according to a predetermined encryption algorithm. A modulation section 24 modulates the encrypted tag ID. A transmission control section 25 performs transmission control of a modulated wave to be outputted from the modulation section 24. An antenna 26 transmits the modulated wave based on the control by the transmission control section 25. The power supply section 7 supplies power to each section at all times. Note that the encryption processing section 23 may be omitted.

In the above, the card information reading section 27 composes one embodiment of a reading unit and a detection unit in the present invention, the determination section 28 composes one embodiment of a determination unit in the present invention, the memory 21 composes one embodiment of a storage unit in the present invention, and the modulation section 24, the transmission control section 25, and the antenna 26 compose one embodiment of a transmission unit in the present invention.

Figure 17:
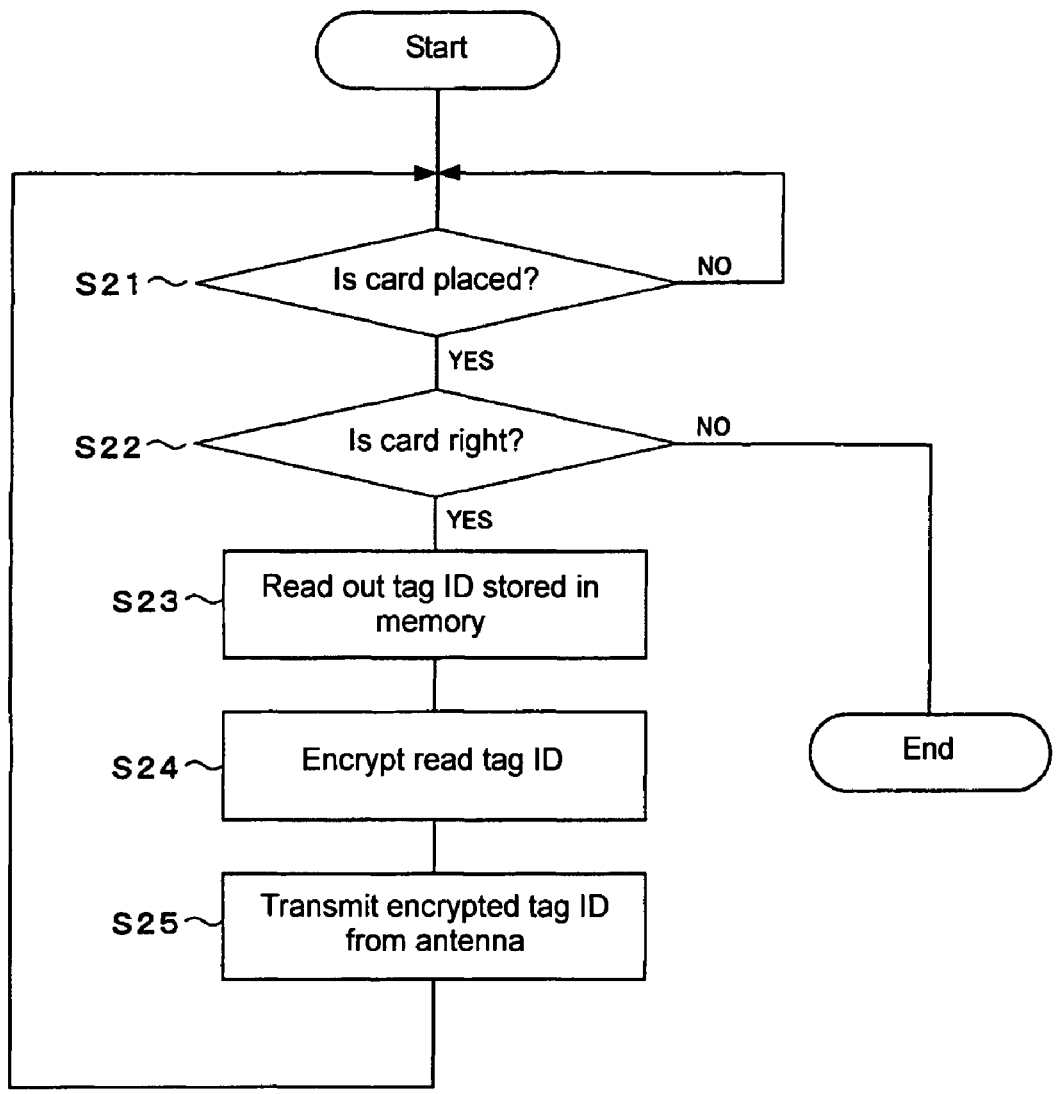
FIG. 17 shows a flowchart showing an operation of the radio tag.

FIG. 17 is a flowchart showing an operation of the radio tag 100 according to the third embodiment. At step S21, it monitors whether the card 200 is placed in the radio tag 100, based on an output from the card information reading section 27. If the card 200 is placed (YES at step S21), then the process moves to step S22 where it determines whether the placed card 200 is the right card, i.e., whether a read card ID matches the tag ID 22 or whether the read card ID and the tag ID 22 have a predetermined correspondence relationship. If the card ID and the tag ID 22 are matched or have the predetermined correspondence relationship, then the card 200 is determined to be the right card of the owner of the radio tag 100. If the card ID and the tag ID 22 are not matched or do not have the predetermined correspondence relationship, then the card 200 is determined not to be the right card of the owner of the radio tag 100.

If, as a result of the determination at step S22, the card 200 is the right card (YES at step S22), then the process proceeds to step S23 where the tag ID 22 stored in the memory 21 is read out. Then, at the next step S24, the read tag ID 22 is encrypted by the encryption processing section 23. At step S25, the encrypted tag ID is transmitted through the modulation section 24, the transmission control section 25, and the antenna 26. After the tag ID is transmitted, the process returns to step S21. While the right card 200 is being placed, steps S23 to S25 are repeated and the tag ID is transmitted from the radio tag 100 in a predetermined cycle. On the other hand, if, as a result of the determination at step S22, the placed card 200 is not the right card (NO at step S22), then the process ends without performing processes at step 23 and subsequent steps thereto.

As such, in the third embodiment, only when a card 200 is placed in the card holder 2 and the card 200 is the right card associated with a tag ID, i.e., the card 200 is the card of the owner of the radio tag 100, the radio tag 100 is activated and the tag ID is transmitted. When a card 200 is not placed in the card holder 2 or when, though a card 200 is placed in the card holder 2, the card 200 is not the card of the owner of the radio tag 100, the radio tag 100 is not activated and thus a tag ID is not transmitted. Therefore, since the functions of the radio tag 100 become effective only when the radio tag 100 and the card 200 of the owner of the radio tag 100 are used together, even when the radio tag 100 and the card 200 are separated from each other and only the radio tag 100 is handed over to another person, unless the card 200 of the owner of the radio tag 100 is placed in the radio tag 100, a tag ID is not transmitted. In addition, even if a card of another person is placed in the radio tag 100, the card is not the card of the owner of the radio tag 100 and thus is not determined to be the right card; accordingly, a tag ID is not transmitted. Hence, the occurrence of erroneous presence management, illegal actions, and the like are more strongly prevented, making it possible to further enhance security.

Next, an exemplary operation of the system in FIG. 1 for the case of using the radio tag 100 according to the third embodiment will be described. A tag ID transmitted from the radio tag 100 having the right card 200 placed therein is received by the receiver 50. Subsequent operational steps are the same as those for the first embodiment. Specifically, the receiver 50 transmits the received tag ID and a receiver ID to the management server 60. The management server 60 determines, based on the IDs, whether to grant or deny access to the computer room 30 and the computers 35. If access is granted, then an access grant signal is transmitted to the controller 32 and the computers 35 from the management server 60, whereby an unlock process for the electric lock 33 and a login process for the computers 35 are performed. Accordingly, the user P can enter the computer room 30 and use the computers 35. On the other hand, if access is denied, then an access denial signal is transmitted to the controller 32 and the computers 35 from the management server 60 and thus an unlock process for the electric lock 33 and a login process for the computers 35 are not performed. Accordingly, the user P cannot enter the computer room 30 and use the computers 35.

In the above-described manner, the user P can access a predetermined location (computer room 30) and predetermined equipment (computers 35) only when the card 200 of the user P is placed in the radio tag 100. Here, although only the case is described in which the management server 60 authenticates access grant/denial, an operation is also possible in which the management server 60 performs presence management for the user P based on a tag ID transmitted from the radio tag 100 and a receiver ID of the receiver 50 having received the tag ID.

Figure 18:
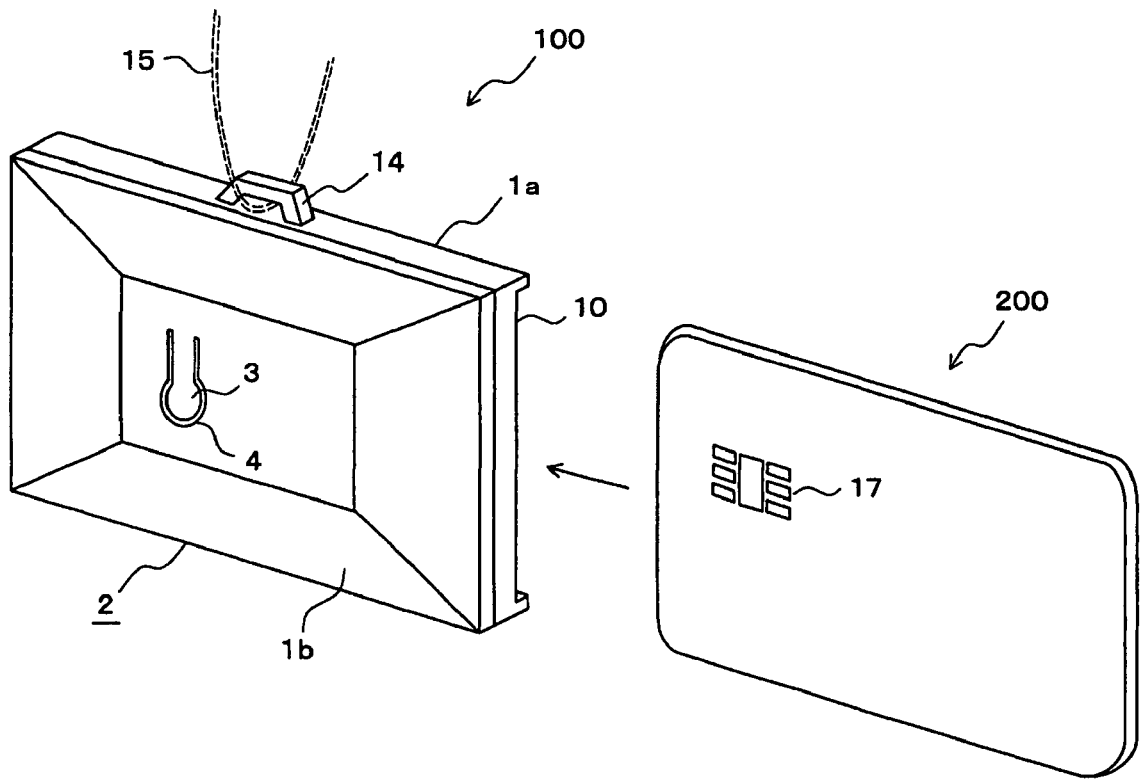
FIG. 18 shows an external view of a radio tag as seen from the back side thereof, according to a fourth embodiment of the present invention.

FIGS. 18 to 21 show a fourth embodiment of the present invention. FIG. 18 is an external view of a radio tag 100 as seen from the back side thereof. In FIG. 18, the same parts as those in FIG. 14 are denoted by the same reference numerals. In the present embodiment, in addition to the configuration in FIG. 14, the same operation button 3 and cut groove 4 as those in FIG. 8 are provided to a cover 1b. Note that a card holder 2 has built therein a circuit board 6, a power supply section 7, a circuit section 8, and a button press detection switch 9 which are shown in FIG. 9B.

Figure 19:
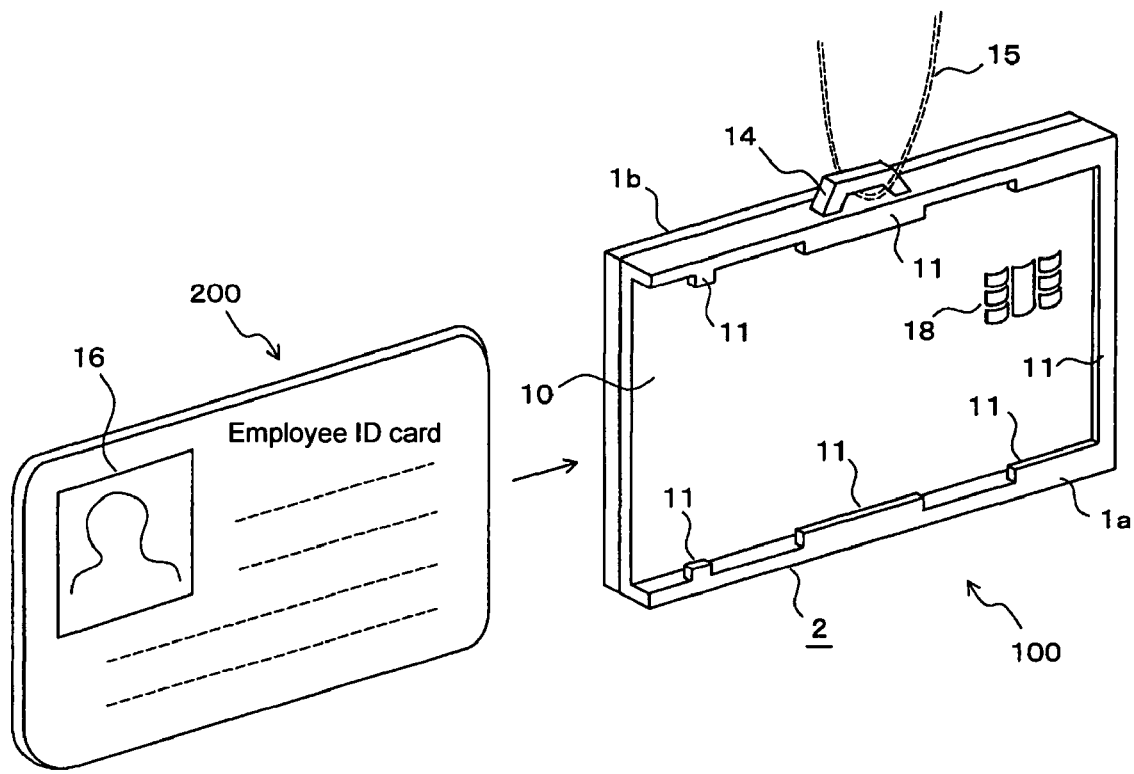
FIG. 19 shows an external view of the radio tag as seen from the front side thereof.

FIG. 19 is an external view of the radio tag 100 as seen from the front side thereof. FIG. 19 is substantially the same as FIG. 15 and thus the same parts as those in FIG. 15 are denoted by the same reference numerals.

Figure 20:
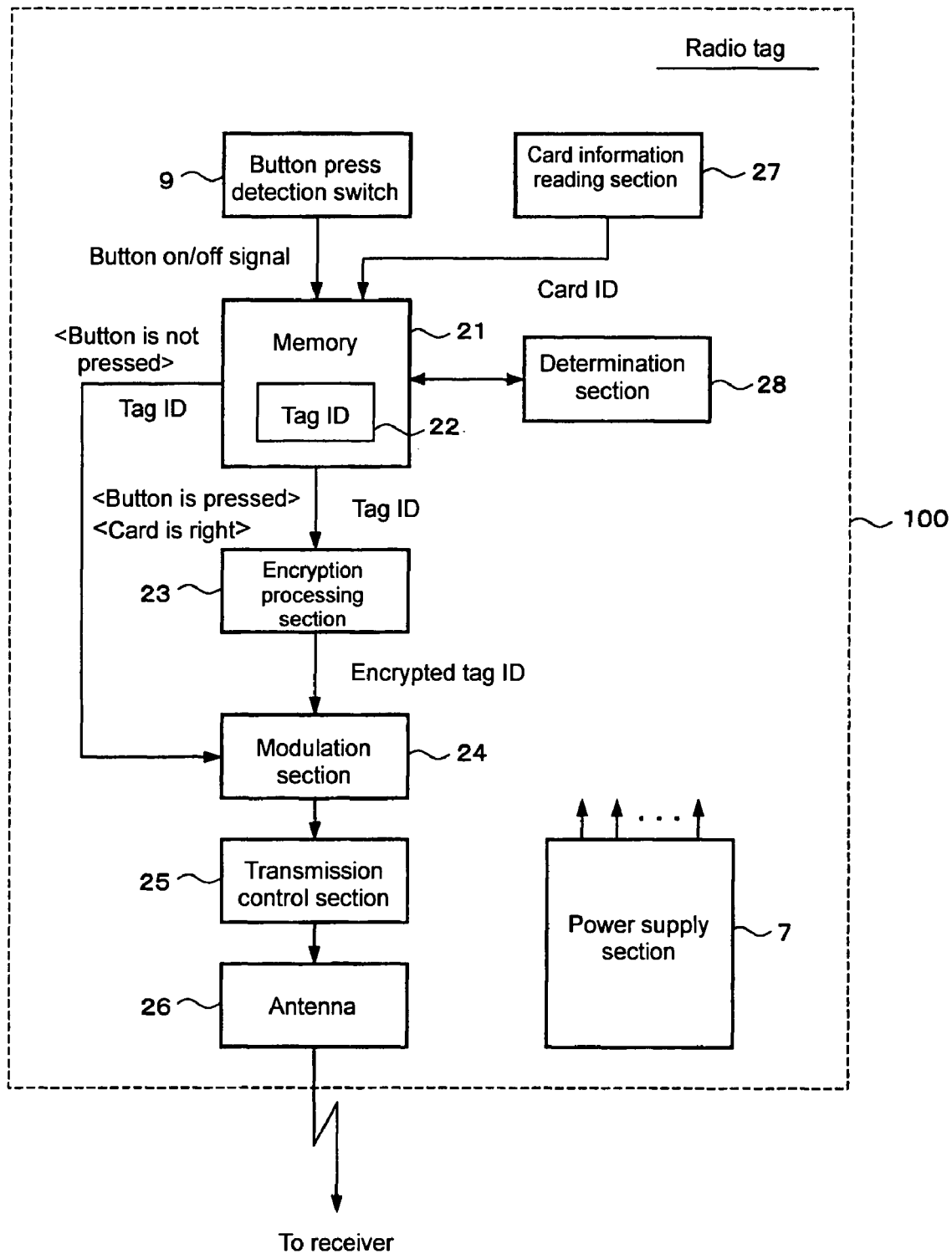
FIG. 20 shows a block diagram showing an electrical configuration of the radio tag.

FIG. 20 is a block diagram showing an electrical configuration of the radio tag 100. In FIG. 20, the same parts as those in FIG. 16 are denoted by the same reference numerals. Reference numeral 9 denotes the aforementioned button press detection switch. The button press detection switch 9 outputs a button ON signal when the operation button 3 is pressed and outputs a button OFF signal when the operation button 3 is not pressed. Reference numeral 27 denotes a card information reading section including the aforementioned contact 18. The card information reading section 27 reads information stored in a card 200 in a state in which the card 200 is placed in a card placement section 10 and a contact point 17 of the card 200 is in contact with the contact 18. The card 200 has stored therein a card ID associated with a tag ID, as card information. The card ID is read by the card information reading section 27. The read card ID is temporarily stored in a memory 21. The card information reading section 27 also serves as a card detection section that detects whether there is a card, based on whether card information is able to be read. Reference numeral 21 denotes the memory having stored therein a tag ID 22 unique to the radio tag 100. The tag ID 22 is stored in 7-digit plain text, for example.

Reference numeral 28 denotes a determination section. The determination section 28 checks a card ID read by the card information reading section 27 against the tag ID 22 stored in the memory 21 to determine whether the card ID and the tag ID 22 are matched or whether the card ID and the tag ID 22 have a predetermined correspondence relationship. When a button ON signal is outputted from the button press detection switch 9, if the card ID and the tag ID 22 are matched or have the predetermined correspondence relationship, then the tag ID 22 read out from the memory 21 is provided to an encryption processing section 23. If the card ID and the tag ID 22 are not matched or do not have the predetermined correspondence relationship, the tag ID 22 is not read out from the memory 21. When a button OFF signal is outputted from the button press detection switch 9, the tag ID 22 read out from the memory 21 is provided to a modulation section 24. The encryption processing section 23 encrypts the tag ID 22 according to a predetermined encryption algorithm. The modulation section 24 modulates the encrypted tag ID. A transmission control section 25 performs transmission control of a modulated wave to be outputted from the modulation section 24. An antenna 26 transmits the modulated wave based on the control by the transmission control section 25. The power supply section 7 supplies power to each section at all times.

In the above, the card information reading section 27 composes one embodiment of a reading unit and a detection unit in the present invention, the determination section 28 composes one embodiment of a determination unit in the present invention, the memory 21 composes one embodiment of a storage unit in the present invention, the modulation section 24, the transmission control section 25, and the antenna 26 compose one embodiment of a transmission unit in the present invention, and the operation button 3 composes one embodiment of an operation section in the present invention.

Figure 21:
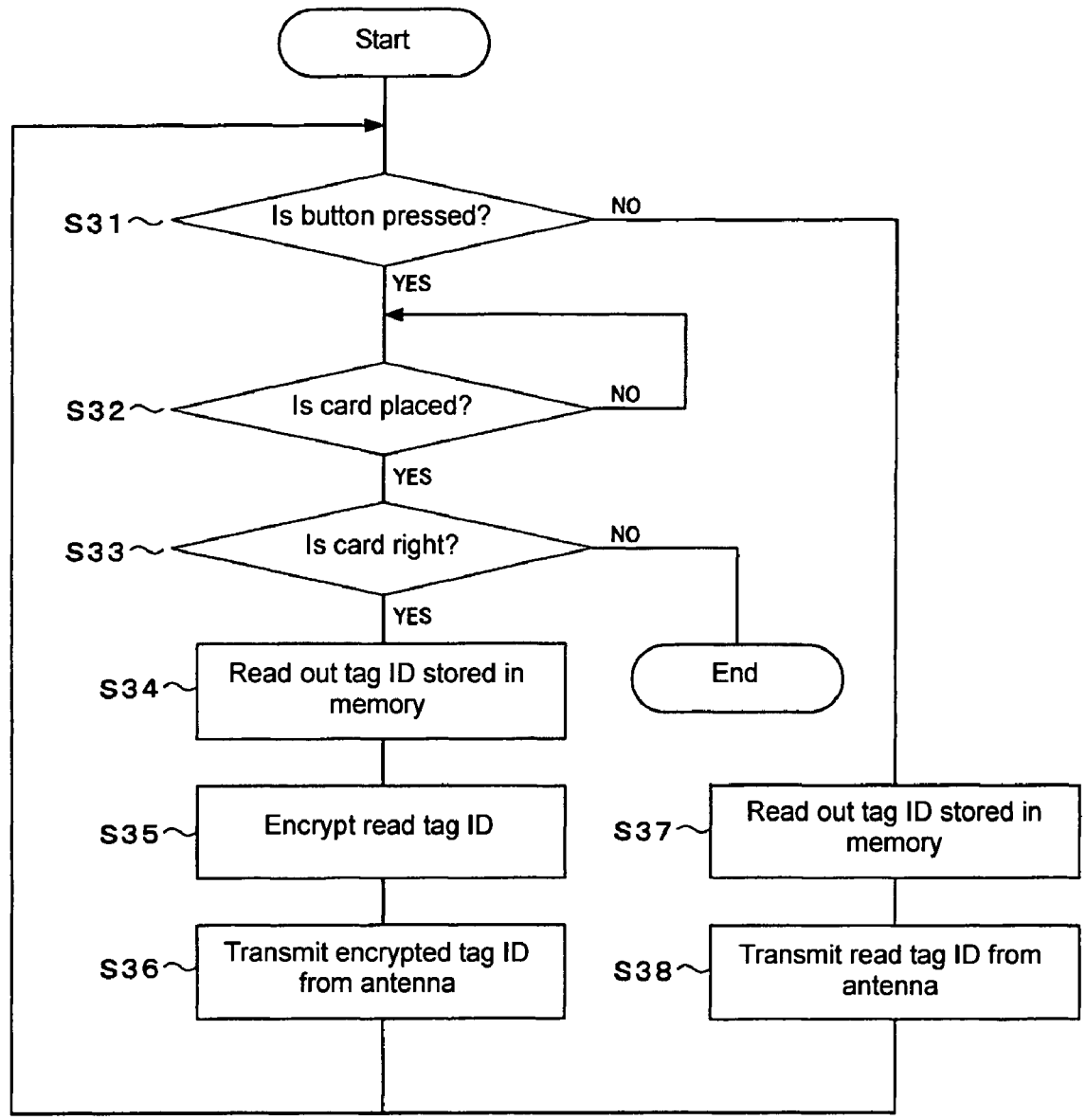
FIG. 21 shows a flowchart showing an operation of the radio tag.

FIG. 21 is a flowchart showing an operation of the radio tag 100 according to the fourth embodiment. At step S31, it monitors whether the operation button 3 is pressed, based on an output from the button press detection switch 9. If the operation button 3 is not pressed (NO at step S31), then the process moves to step S37 where the tag ID 22 stored in the memory 21 is read out. At the next step S38, the read tag ID 22 is transmitted through the modulation section 24, the transmission control section 25, and the antenna 26. The tag ID in this case is transmitted in its original plain text form without being encrypted, and used for presence management.

On the other hand, if the operation button 3 is pressed (YES at step S31), then the process moves to step S32 where it determines whether the card 200 is placed in the radio tag 100, based on an output from the card information reading section 27. If the card 200 is placed (YES at step S32), then the process proceeds to step S33. If the card 200 is not placed (NO at step S32), then the process does not proceed to step S33 and waits for the card to be placed.

At step S33, it determines whether the placed card 200 is the right card, i.e., whether a read card ID matches the tag ID 22 or whether the read card ID and the tag ID 22 have a predetermined correspondence relationship. If the card ID and the tag ID 22 are matched or have the predetermined correspondence relationship, then the card 200 is determined to be the right card of the owner of the radio tag 100. If the card ID and the tag ID 22 are not matched or do not have the predetermined correspondence relationship, then the card 200 is determined not to be the right card of the owner of the radio tag 100. If, as a result of the determination, the card 200 is the right card (YES at step S33), then the process proceeds to step S34 where the tag ID 22 stored in the memory 21 is read out. Then, at the next step S35, the read tag ID 22 is encrypted by the encryption processing section 23. At step S36, the encrypted tag ID is transmitted through the modulation section 24, the transmission control section 25, and the antenna 26. After the tag ID is transmitted, the process returns to step S31. While the operation button 3 is being pressed and the right card 200 is being placed, steps S34 to S36 are repeated and the tag ID is transmitted from the radio tag 100 in a predetermined cycle. The tag ID in this case is encrypted and used for access management such as management of entering and leaving the room. On the other hand, if, as a result of the determination at step S33, the placed card 200 is not the right card (NO at step S33), then the process ends without performing processes at step 34 and subsequent steps thereto.

As such, in the fourth embodiment, the following operation can be performed. Specifically, in the case, for example, of management of entering and leaving the room that requires a high degree of security, presence management is performed such that on conditions that the operation button 3 is operated on the radio tag 100, a card 200 is placed in the radio tag 100, and the card 200 is the right card (the card of the owner of the radio tag 100), a tag ID is encrypted and transmitted and when the operation button 3 is not operated, regardless of whether a card 200 is placed or whether a card 200 is right, a tag ID is transmitted in its original plain text form. In addition, it becomes possible to separately use access management and presence management using a single radio tag 100.

Next, an exemplary operation of the system in FIG. 1 for the case of using the radio tag 100 according to the fourth embodiment will be described. An operation for the case in which the operation button 3 of the radio tag 100 is not pressed is the same as that for the second embodiment. Specifically, a tag ID (a tag ID in plain text form without being encrypted) transmitted from the radio tag 100 is received by the receiver 50. The tag ID and a receiver ID are transmitted to the management server 60 from the receiver 50. Based on the receiver ID and tag ID received from the receiver 50, the management server 60 performs presence management and transmits, if necessary, management information to a host server.

When the operation button 3 of the radio tag 100 is pressed with the right card 200 being placed, a transmitted tag ID (encrypted tag ID) is received by the receiver 50. Subsequent operational steps are the same as those for the second embodiment. Specifically, the receiver 50 transmits the received tag ID and a receiver ID to the management server 60. The management server 60 determines, based on the IDs, whether to grant or deny access to the computer room 30 and the computers 35. If access is granted, then an access grant signal is transmitted to the controller 32 and the computers 35 from the management server 60, whereby an unlock process for the electric lock 33 and a login process for the computers 35 are performed. Accordingly, the user P can enter the computer room 30 and use the computers 35. On the other hand, if access is denied, then an access denial signal is transmitted to the controller 32 and the computers 35 from the management server 60 and thus an unlock process for the electric lock 33 and a login process for the computers 35 are not performed. Accordingly, the user P cannot enter the computer room 30 and use the computers 35.

In the above-described manner, the user P can access a predetermined location (computer room 30) and predetermined equipment (computers 35) only when pressing the operation button 3 of the radio tag 100 with the card 200 of the user P being placed in the radio tag 100.

In the present invention, in addition to the above-described embodiments, various embodiments such as the one described below can be adopted. For example, the number of times a card 200 is removed from a card holder 2 is counted and when such a number of times has reached a predetermined value, some or all of the functions of a radio tag 100 may be suspended. By doing so, in the case in which a radio tag 100 and a card 200 are separated from each other and only the radio tag 100 is lent to another person, when the number of times has reached the predetermined value, the radio tag 100 stops functioning, and thus, illegal use of the radio tag 100 by another person can be limited.

Figure 22:
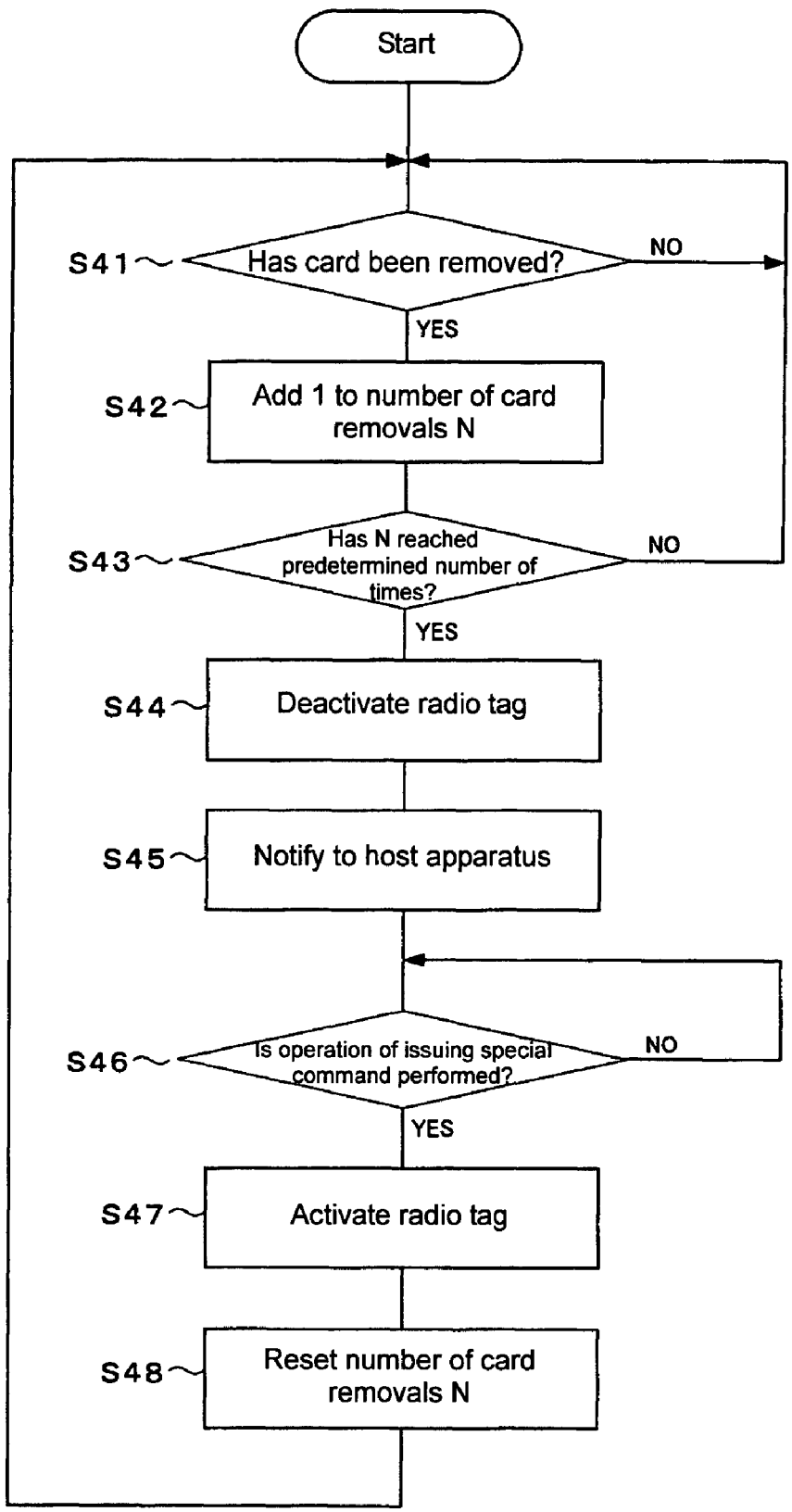
FIG. 22 shows a flowchart showing another exemplary operation of a radio tag.

FIG. 22 is a flowchart showing an exemplary operation for this case. At step S41, it determines whether a card 200 has been removed from a card holder 2, based on an output from a card detection switch 12 or a card information reading section 27. If the card 200 has been removed (YES at step S41), then 1 is added to the number of card removals N (N=0 in an initial state) (step S42). Then, it determines whether N has reached a predetermined number of times (step S43). If N has not reached the predetermined number of times (NO at step S43), then the process returns to step S41. If N has reached the predetermined number of times (YES at step S43), then the process moves to step S44 where a radio tag 100 is deactivated. In this case, transmission of a tag ID may be entirely stopped. Alternatively, transmission of a tag ID may be stopped only when an operation button 3 is operated and the tag ID may be transmitted when the operation button 3 is not operated. When the radio tag 100 is deactivated, the process proceeds to step S45 where the deactivation of the radio tag 100 is notified to a host apparatus.

Thereafter, it determines whether an operation of issuing a special command is performed on the radio tag 100 (step S46). A special command is generated by, for example, performing a long push of the operation button 3 five times in a row. Since only a person in charge of the radio tag 100 knows an operation of issuing a special command, such an operation is performed by the person in charge of the radio tag 100. If this operation is performed (YES at step S46), then the function suspension of the radio tag 100 is cancelled based on the special command and the radio tag 100 is activated again (step S47). Thereafter, the number of card removals N is reset (step S48) and the process returns to step S41. By this, the radio tag 100 can be used again.

Although in the second and fourth embodiments an operation button 3 is provided to a radio tag 100 as an operation unit, the operation unit is not limited to an operation button and an operation lever or the like can also be used.

Although in each of the embodiments a contactless IC card is used as an example of a card 200, the present invention can also be applied to the case in which a contact IC card or a magnetic card is used.

Although in each of the embodiments both access management and presence management are performed by the management server 60, an access management server and a presence management server may be separately provided. Instead of the management server 60 authenticating access grant/denial, the receiver 50 may authenticate access grant/denial. In this case, the function of access management in the management server 60 should be transferred to the receiver 50 and an authentication unit and an access management unit are composed by the receiver 50. Alternatively, instead of the receiver 50, it is also possible to perform authentication of access grant/denial on a terminal apparatus (e.g., the controller 32) provided accompanying the receiver 50. In this case, the function of access management in the management server 60 should be transferred to the terminal apparatus and an authentication unit and an access management unit are composed by the terminal apparatus.

What is claimed is:

1. An active radio tag comprising:
a storage unit having stored therein a tag ID;
a transmission unit that transmits, by radio, the tag ID in a predetermined signal form;
a card holder having the storage unit and the transmission unit built therein and including a card placement section in which a card is to be placed; and
a detection unit that detects a card placed in the card holder, wherein when the detection unit detects a card, transmission of the tag ID is allowed and when the detection unit does not detect a card, transmission of the tag ID is prohibited,
wherein the card holder includes an operation section, the transmission unit transmits the tag ID in different signal forms for different cases, a case in which the operation section is operated and a case in which the operation section is not operated, when the operation section is operated, if the detection unit detects a card, then transmission of the tag ID in a first signal form is allowed, and if the detection unit does not detect a card, then transmission of the tag ID in the first signal form is prohibited, and when the operation section is not operated, regardless of whether there is a card, transmission of the tag ID in a second signal form is allowed.

2. An active radio tag comprising:
a storage unit having stored therein a tag ID;
a transmission unit that transmits, by radio, the tag ID in a predetermined signal form:
a card holder having the storage unit and the transmission unit built therein and including a card placement section in which a card is to be placed;
a detection unit that detects a card placed in the card holder;
a reading unit that reads card information stored in the card detected by the detection unit; and
a determination unit that checks the card information read by the reading unit against the tag ID to determine whether the card is a right card, wherein when the detection unit detects a card, if the determination unit determines that the card is right, then transmission of the tag ID is allowed, and if the determination unit determines that the card is not right, then transmission of the tag ID is prohibited, and wherein when the detection unit does not detect a card, transmission of the tag ID is prohibited,
wherein the card holder includes an operation section, the transmission unit transmits information on the tag ID in different signal forms for different cases, a case in which the operation section is operated and a case in which the operation section is not operated, when the operation section is operated with a card being detected by the detection unit, if the determination unit determines that the card is right, then transmission of the tag ID in a first signal form is allowed, and if the determination unit determines that the card is not right, then transmission of the tag ID in the first signal form is prohibited, and when the operation section is not operated, regardless of whether there is a card and whether the card is right, transmission of the tag ID in a second signal form is allowed.

3. An active radio tag according to claim 1 or 2, wherein the first signal form is a form of a signal in which the tag ID is encrypted and the second signal form is a form of a signal in which the tag ID is not encrypted.

4. An active radio tag according to claim 1 or 2, wherein a number of times the card is removed from the card holder is counted based on results of detection by the detection unit, and when the number of removals has reached a predetermined value, some or all of functions of the radio tag are suspended.

5. An active radio tag according to claim 4, wherein function suspension can be cancelled based on a special command.

6. A security management system comprising:
an active radio tag according to claim 1 or 2;
a receiving unit that receives a tag ID transmitted from the radio tag; and
an authentication unit that performs predetermined authentication based on the tag ID received by the receiving unit.

7. A security management system comprising:
an active radio tag according to any one of claims 1 to 2;
a receiving unit that receives a tag ID transmitted from the radio tag;
an access management unit that grants or denies access to a predetermined access target based on a tag ID in a first signal form received by the receiving unit; and a presence management unit that manages presence of the radio tag based on a tag ID in a second signal Form received by the receiving unit.

8. A security management method comprising:
transmitting a tag ID from an active radio tag according to claim 1 or 2;
receiving, by a receiving unit, the tag ID transmitted from the radio tag; and
performing, by an authentication unit, predetermined authentication based on the tag ID received by the receiving unit.

9. A security management method comprising:
transmitting a tag ID from an active radio tag according to any one of claims 1 to 2;
receiving, by a receiving unit, the tag ID transmitted from the radio tag;
granting or denying, by an access management unit, access to a predetermined access target based on a tag ID in a first signal form received by the receiving unit; and
managing, by a presence management unit, presence of the radio tag based on a tag ID in a second signal form received by the receiving unit.

* * * * *